United States Patent
Yu et al.

(10) Patent No.: US 12,200,057 B2
(45) Date of Patent: Jan. 14, 2025

(54) SENSOR PERFORMANCE INDICATION

(71) Applicant: Qualcomm Incorporated, San Diego, CA (US)

(72) Inventors: Lan Yu, Beijing (CN); Hong Cheng, Bridgewater, NJ (US); Dan Vassilovski, Del Mar, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/768,654

(22) PCT Filed: Nov. 5, 2019

(86) PCT No.: PCT/CN2019/115572
§ 371 (c)(1),
(2) Date: Apr. 13, 2022

(87) PCT Pub. No.: WO2021/087723
PCT Pub. Date: May 14, 2021

(65) Prior Publication Data
US 2023/0171315 A1 Jun. 1, 2023

(51) Int. Cl.
*H04L 67/12* (2022.01)
*G06F 9/54* (2006.01)

(52) U.S. Cl.
CPC .............. *H04L 67/12* (2013.01); *G06F 9/546* (2013.01)

(58) Field of Classification Search
CPC .......... H04L 67/12; G06F 9/546; H04W 4/70; H04W 84/18
See application file for complete search history.

(56) References Cited

U.S. PATENT DOCUMENTS 10,426,087 B2 * 10/2019 Bruns ................... A01D 41/127
2013/0053656 A1 * 2/2013 Mollicone ............ A61B 5/0015
600/595

(Continued)

FOREIGN PATENT DOCUMENTS

CN 104469356 A 3/2015
CN 107636752 A 1/2018

(Continued)

OTHER PUBLICATIONS

Demba, Albert, and Dietmar PF Möller. "Vehicle-to-vehicle communication technology." 2018 IEEE international conference on electro/information technology (EIT). IEEE, 2018.*

(Continued)

*Primary Examiner* — Jimmy H Tran
(74) *Attorney, Agent, or Firm* — Holland & Hart/QUALCOMM Incorporated

(57) ABSTRACT

Methods, systems, and devices for wireless communications are described. A user equipment (UE) that transmits sensor data to another UE may also send information about the associated sensor and its performance. For example, the UE may determine a set of rules that apply to a sensor. The set of rules may define an association between a group of performance values and a group of performance levels corresponding to one or more metrics of the sensor. The UE may identify a performance value from the group of performance values for the sensor based on a performance level of the sensor and the set of rules. After determining the performance value, the UE may transmit an indication of the set of in a first data frame of a message and an indication of the performance value in a second data frame of the message.

60 Claims, 16 Drawing Sheets

(56) References Cited

U.S. PATENT DOCUMENTS

| | | | | |
|---|---|---|---|---|
| 2013/0107909 | A1* | 5/2013 | Jones | H04B 1/715 |
| | | | | 455/73 |
| 2014/0095691 | A1* | 4/2014 | Ganguli | H04L 41/5009 |
| | | | | 709/224 |
| 2016/0117144 | A1* | 4/2016 | Soldner | H04N 21/00 |
| | | | | 700/94 |
| 2016/0212218 | A1* | 7/2016 | Dubois | H04L 63/0428 |
| 2016/0295624 | A1* | 10/2016 | Novlan | H04L 67/12 |
| 2017/0025017 | A1* | 1/2017 | Thomas | G06F 18/254 |
| 2017/0070911 | A1* | 3/2017 | Huang | H04W 74/0816 |
| 2017/0099671 | A1* | 4/2017 | Li | H04W 72/21 |
| 2017/0200197 | A1* | 7/2017 | Brubaker | B60Q 1/2619 |
| 2017/0257258 | A1* | 9/2017 | Bingham | H04L 41/22 |
| 2018/0053403 | A1* | 2/2018 | Wieskamp | G01S 13/931 |
| 2018/0232563 | A1* | 8/2018 | Albadawi | A61B 5/1113 |
| 2019/0043341 | A1* | 2/2019 | Wouhaybi | H04L 12/2803 |
| 2019/0052380 | A1* | 2/2019 | Cui | H04W 48/12 |
| 2019/0052637 | A1 | 2/2019 | Dean et al. | |
| 2019/0132709 | A1* | 5/2019 | Graefe | G08G 1/04 |
| 2019/0146426 | A1* | 5/2019 | Blank | A01D 41/127 |
| | | | | 701/50 |
| 2019/0222256 | A1* | 7/2019 | Nammi | H04L 5/006 |
| 2019/0361694 | A1* | 11/2019 | Gordon | G06F 1/3231 |
| 2020/0084193 | A1* | 3/2020 | Beaurepaire | G05D 1/0287 |
| 2020/0092596 | A1* | 3/2020 | Moore, Jr. | H04W 4/70 |
| 2020/0092693 | A1* | 3/2020 | Zhang | G08G 1/0112 |
| 2020/0143593 | A1* | 5/2020 | Rudman | G06T 19/006 |
| 2020/0219389 | A1* | 7/2020 | Hacker | G08G 1/0133 |
| 2020/0314670 | A1* | 10/2020 | Van Phan | H04W 36/0094 |
| 2020/0394916 | A1* | 12/2020 | Salles | G05D 1/0287 |
| 2021/0074288 | A1* | 3/2021 | Stefanski | G06F 16/2471 |
| 2021/0075836 | A1* | 3/2021 | Ein-Gil | G06F 9/468 |
| 2021/0084519 | A1* | 3/2021 | Nammi | H04W 28/0205 |
| 2021/0114616 | A1* | 4/2021 | Altman | H04N 21/41422 |
| 2021/0150828 | A1* | 5/2021 | Mezaael | H04W 4/40 |
| 2021/0153062 | A1* | 5/2021 | Zhang | H04W 40/246 |
| 2021/0166824 | A1* | 6/2021 | Sugaya | H04W 4/38 |
| 2021/0289510 | A1* | 9/2021 | Nammi | H04B 7/0639 |
| 2021/0337423 | A1* | 10/2021 | Ali | H04W 28/24 |
| 2021/0383620 | A1* | 12/2021 | Goluguri | G07C 5/0841 |
| 2022/0132603 | A1* | 4/2022 | Adjakple | H04W 8/005 |
| 2022/0167209 | A1* | 5/2022 | Baek | H04W 28/02 |
| 2022/0172624 | A1* | 6/2022 | Salles | B60W 10/10 |
| 2022/0182793 | A1* | 6/2022 | Graefe | H04W 4/06 |
| 2022/0191918 | A1* | 6/2022 | Dudda | H04L 47/78 |
| 2022/0256317 | A1* | 8/2022 | Novlan | H04W 84/20 |
| 2023/0171315 | A1* | 6/2023 | Yu | H04L 67/12 |
| | | | | 709/224 |
| 2023/0195127 | A1* | 6/2023 | Dean | G05D 1/0274 |
| | | | | 701/28 |
| 2024/0073796 | A1* | 2/2024 | Azizi | G06F 9/5072 |

FOREIGN PATENT DOCUMENTS

| | | |
|---|---|---|
| EP | 1595192 B1 | 5/2013 |
| WO | WO-2019116670 A1 | 6/2019 |
| WO | WO-2019172846 A1 | 9/2019 |

OTHER PUBLICATIONS

Lyu, Feng, et al. "Characterizing urban vehicle-to-vehicle communications for reliable safety applications." IEEE Transactions on Intelligent Transportation Systems 21.6 (2019): 2586-2602.*

He, Ruisi, et al. "Propagation channels of 5G millimeter-wave vehicle-to-vehicle communications: Recent advances and future challenges." IEEE vehicular technology magazine 15.1 (2019): 16-26.*

Supplementary European Search Report—EP19951567—Search Authority—The Hague—dated Jul. 25, 2023 (195823EP).

International Search Report and Written Opinion—PCT/CN2019/115572—ISA/EPO—dated Aug. 7, 2020 (195823WO1).

"SAE Project Proposal: V2X Sensor-Sharing for Cooperative & Automated Driving", Advanced Applications Technical Committee, 7 Pages.

ETSI TR 103 562: "Intelligent Transport System (ITS), Vehicular Communications, Basic Set of Applications, Analysis of the Collective Perception Service (CPS)", V0.0.19, Sep. 2019, 77 Pages.

ETSI: "Intelligent Transport Systems (ITS), Facilities Layer Function, Part 2: Position and Time Management (PoTi), Release 2," ETSI EN 302 890-2, V2.1.1, Oct. 2020, pp. 1-42.

ETSI: "Intelligent Transport Systems (ITS), Users and Applications Requirements, Part 2: Applications and Facilities Layer Common Data Dictionary," ETSI TS 102 894-2, V1.3.1, Aug. 2018, pp. 1-100.

ETSI: "Intelligent Transport Systems (ITS), Vehicular Communications, Basic Set of Applications, Part 2: Specification of Cooperative Awareness Basic Service," ETSI EN 302 637-2, V1.4.1, Jan. 2019, pp. 1-45.

Itu-T X.691: "Series X: Data Networks and Open System Communications OSI Networking and System Aspects—Abstract Syntax Notation One (ASN.1)," Information Technology—ASN.1 Encoding Rules—Specification of Packed Encoding Rules (PER), Dec. 1997, 53 pages.

* cited by examiner

SENSOR PERFORMANCE INDICATION

CROSS REFERENCE

The present application is a 371 national stage filing of International PCT Application No. PCT/CN2019/115572 by Yu et al., entitled "SENSOR PERFORMANCE INDICATION," filed Nov. 5, 2019, which is assigned to the assignee hereof, and which is expressly incorporated by reference in its entirety herein.

INTRODUCTION

The following relates generally to wireless communications and more specifically to indicating the performance of one or more sensors at a wireless device.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method of wireless communication at a wireless device is described. The method may include identifying a configured set of one or more rules that apply to a sensor configured to monitor one or more conditions, the configured set of one or more rules defining an association between a set of performance values and a set of performance levels corresponding to one or more metrics of the sensor, identifying a performance value from the set of performance values for the sensor based on a performance level of the sensor and the configured set of one or more rules, and transmitting, to a second wireless device, an indication of the configured set of one or more rules for the sensor in a message and an indication of the performance value for the sensor in the message.

An apparatus for wireless communication at a wireless device is described. The apparatus may include a processor and memory coupled to the processor. The processor and memory may be configured to identify a configured set of one or more rules that apply to a sensor configured to monitor one or more conditions, the configured set of one or more rules defining an association between a set of performance values and a set of performance levels corresponding to one or more metrics of the sensor, identify a performance value from the set of performance values for the sensor based on a performance level of the sensor and the configured set of one or more rules, and transmit, to a second wireless device, an indication of the configured set of one or more rules for the sensor in a message and an indication of the performance value for the sensor in the message.

Another apparatus for wireless communication at a wireless device is described. The apparatus may include means for identifying a configured set of one or more rules that apply to a sensor configured to monitor one or more conditions, the configured set of one or more rules defining an association between a set of performance values and a set of performance levels corresponding to one or more metrics of the sensor, identifying a performance value from the set of performance values for the sensor based on a performance level of the sensor and the configured set of one or more rules, and transmitting, to a second wireless device, an indication of the configured set of one or more rules for the sensor in a message and an indication of the performance value for the sensor in the message.

A non-transitory computer-readable medium storing code for wireless communication at a wireless device is described. The code may include instructions executable by a processor to identify a configured set of one or more rules that apply to a sensor configured to monitor one or more conditions, the configured set of one or more rules defining an association between a set of performance values and a set of performance levels corresponding to one or more metrics of the sensor, identify a performance value from the set of performance values for the sensor based on a performance level of the sensor and the configured set of one or more rules, and transmit, to a second wireless device, an indication of the configured set of one or more rules for the sensor in a message and an indication of the performance value for the sensor in the message.

In some examples of the method, apparatuses, and non-transitory computer-readable medium described herein the indication of the configured set of one or more rules is transmitted in a first data frame of the message. Some examples of the method, apparatuses, and non-transitory computer-readable medium described herein may further include operations, features, means, or instructions for transmitting the performance value in a first data element of a second data frame of the message, the performance value corresponding to a first metric of the sensor, identifying a second performance value for the sensor based on a second performance level of the sensor and the configured set of one or more rules, the second performance value corresponding to a second metric different than the first metric, and transmitting the second performance value for the sensor in a second data element of the second data frame.

Some examples of the method, apparatuses, and non-transitory computer-readable medium described herein may further include operations, features, means, or instructions for determining the performance level of the sensor, the performance level corresponding to a first metric of the sensor, and determining a second performance level of the sensor, the second performance level corresponding to a second metric different than the first metric, where the performance value may be identified based on the performance level and the second performance level.

Some examples of the method, apparatuses, and non-transitory computer-readable medium described herein may further include operations, features, means, or instructions for determining the performance level of the sensor, the performance level corresponding to a first metric of the sensor, and determining a second performance level of a second sensor, where the second performance level corresponds to the first metric and the performance value is identified based on a combination of the performance level and the second performance level.

In some examples of the method, apparatuses, and non-transitory computer-readable medium described herein the indication of the configured set of one or more rules is transmitted in a first data frame of the message and the indication of the performance value is transmitted in a second data frame of the message. Some examples of the method, apparatuses, and non-transitory computer-readable medium described herein may further include operations, features, means, or instructions for determining a third performance level of the sensor, the third performance level corresponding to a second metric of the sensor, determining a fourth performance level of the second sensor, the fourth performance level corresponding to the second metric, identifying a second performance value for the sensor based on a combination of the third performance level and the fourth performance level, and transmitting the second performance value for the sensor in a second data element of the second data frame.

Some examples of the method, apparatuses, and non-transitory computer-readable medium described herein may further include operations, features, means, or instructions for determining a third performance level of the sensor, the third performance level corresponding to a second metric of the sensor, and determining a fourth performance level of the second sensor, the fourth performance level corresponding to the second metric, where the performance value is identified based on a combination of the third and fourth performance levels.

Some examples of the method, apparatuses, and non-transitory computer-readable medium described herein may further include operations, features, means, or instructions for determining an identifier of the sensor, and transmitting an indication of the identifier in the message.

Some examples of the method, apparatuses, and non-transitory computer-readable medium described herein may further include operations, features, means, or instructions for transmitting information about an object detected by the sensor in the message, where the information may be associated with the identifier of the sensor.

Some examples of the method, apparatuses, and non-transitory computer-readable medium described herein may further include operations, features, means, or instructions for determining a type of the sensor, and transmitting an indication of the type in the message.

Some examples of the method, apparatuses, and non-transitory computer-readable medium described herein may further include operations, features, means, or instructions for transmitting, in the message, a value that indicates a subset of rules of the configured set of one or more rules, where the performance value is identified based on the subset of rules.

Some examples of the method, apparatuses, and non-transitory computer-readable medium described herein may further include operations, features, means, or instructions for receiving an indication of the performance level from a third wireless device, where the sensor may be at the third wireless device and the performance level is identified based on the indication of the performance level.

In some examples of the method, apparatuses, and non-transitory computer-readable medium described herein, the one or more metrics of the sensor include a range of the sensor, a resolution of the sensor, a sensitivity of the sensor, an accuracy of the sensor, a refresh rate of the sensor, a depth perception of the sensor, a field-of-view of the sensor, or a combination thereof.

In some examples of the method, apparatuses, and non-transitory computer-readable medium described herein, the performance level includes an actual performance level of the sensor or an expected capability of the sensor.

A method of wireless communication at a wireless device is described. The method may include receiving, in a message, an indication of a configured set of one or more rules that applies to a sensor configured to monitor one or more conditions, the configured set of one or more rules defining an association between a set of performance values and a set of performance levels corresponding to one or more metrics of the sensor, receiving an indication of a performance value for the sensor in the message, and identifying a performance level of the sensor based on the performance value and the configured set of one or more rules.

An apparatus for wireless communication at a wireless device is described. The apparatus may include a processor and memory coupled to the processor. The processor and memory may be configured to receive, in a message, an indication of a configured set of one or more rules that applies to a sensor configured to monitor one or more conditions, the configured set of one or more rules defining an association between a set of performance values and a set of performance levels corresponding to one or more metrics of the sensor, receive an indication of a performance value for the sensor in the message, and identify a performance level of the sensor based on the performance value and the configured set of one or more rules.

Another apparatus for wireless communication at a wireless device is described. The apparatus may include means for receiving, in a message, an indication of a configured set of one or more rules that applies to a sensor configured to monitor one or more conditions, the configured set of one or more rules defining an association between a set of performance values and a set of performance levels corresponding to one or more metrics of the sensor, receiving an indication of a performance value for the sensor in the message, and identifying a performance level of the sensor based on the performance value and the configured set of one or more rules.

A non-transitory computer-readable medium storing code for wireless communication at a wireless device is described. The code may include instructions executable by a processor to receive, in a message, an indication of a configured set of one or more rules that applies to a sensor configured to monitor one or more conditions, the configured set of one or more rules defining an association between a set of performance values and a set of performance levels corresponding to one or more metrics of the sensor, receive an indication of a performance value for the sensor in the message, and identify a performance level of the sensor based on the performance value and the configured set of one or more rules.

Some examples of the method, apparatuses, and non-transitory computer-readable medium described herein may further include operations, features, means, or instructions for receiving information about an object detected by the sensor, and determining a reliability value of the information based on the performance level.

In some examples of the method, apparatuses, and non-transitory computer-readable medium described herein, the information about the object may be received in the same message as the indication of the configured set of one or more rules and the indication of the performance value.

Some examples of the method, apparatuses, and non-transitory computer-readable medium described herein may further include operations, features, means, or instructions for receiving an indication of an ID of the sensor the message, where the information about the object may be associated with the ID of the sensor.

In some examples of the method, apparatuses, and non-transitory computer-readable medium described herein the indication of the configured set of one or more rules is received in a first data frame of the message and the indication of the performance value is received in a first data element of a second data frame of the message. Some examples of the method, apparatuses, and non-transitory computer-readable medium described herein may further include operations, features, means, or instructions for receiving a second performance value for the sensor in a second data element of the second data frame, the second performance value corresponding to a different metric of the sensor than the performance value, and identifying a second performance level of the sensor based on the second performance value and the configured set of one or more rules.

Some examples of the method, apparatuses, and non-transitory computer-readable medium described herein may further include operations, features, means, or instructions for identifying a second performance level of the sensor based on the performance value and the configured set of one or more rules, where the performance level corresponds to a first metric of the sensor and the second performance level corresponds to a second metric different than the first metric.

In some examples of the method, apparatuses, and non-transitory computer-readable medium described herein, the first metric or the second metric includes a range of the sensor, a resolution of the sensor, a sensitivity of the sensor, an accuracy of the sensor, a refresh rate of the sensor, a depth perception of the sensor, or a field-of-view of the sensor.

In some examples of the method, apparatuses, and non-transitory computer-readable medium described herein, the configured set of one or more rules associates the performance value with an average performance level of a set of sensors and the average performance level corresponds to a metric of the sensor.

In some examples of the method, apparatuses, and non-transitory computer-readable medium described herein, the configured set of one or more rules associates the performance value with a second average performance level of the set of sensors and the second average performance level corresponds to a second metric of the sensor.

Some examples of the method, apparatuses, and non-transitory computer-readable medium described herein may further include operations, features, means, or instructions for receiving an indication of a type of the sensor in the message, and determining the type of the sensor based on the indication of the type.

Some examples of the method, apparatuses, and non-transitory computer-readable medium described herein may further include operations, features, means, or instructions for receiving, in the message, a value that indicates a subset of rules of the configured set of one or more rules, where the performance value is identified based on the subset of rules.

DETAILED DESCRIPTION

A UE may use its local sensors to sense various conditions of the UE's environment so that the UE can make environmentally-aware decisions. In some cases, a UE may supplement its own sensor data with sensor data from other UEs to increase the UE's knowledge of the environment. For example, the UE may directly communicate with another UE to receive data captured by the sensors of the other UE. The data may be conveyed to the UE in a message that includes a signature of the originating UE. But the message may not include any indication of the data's reliability, which may vary based on the limitations of the sensor that capture the data. For example, data may be unreliable if it indicates a condition that the capturing sensor is not able to accurately detect.

According to the techniques described herein, a UE that transmits sensor data to another UE may also send information about the associated sensor and its performance so that a receiving UE can evaluate the reliability of the sensor data and factor it into decision-making. For example, the transmitting UE may send the sensor's identifier (ID) as well as its type (e.g., camera, lidar, radar, etc.). The UE may also send an indication of the sensor's performance level for various metrics. For example, the UE may indicate the sensor's expected or actual range, resolution, sensitivity, accuracy, etc. Additional information sent by the UE may include the certifying authority (e.g., a standards or regulating body) that sets performance rules for the UE. Once the performance information is determined, the UE may transmit the performance information in the same message as the sensor data (e.g., the performance indication may be transmitted in a sensor sharing message) or a separate message.

Aspects of the disclosure are initially described in the context of wireless communications systems. Aspects of the disclosure are further illustrated by and described with reference to apparatus diagrams, system diagrams, and flowcharts that relate to sensor performance indication.

Figure 1:
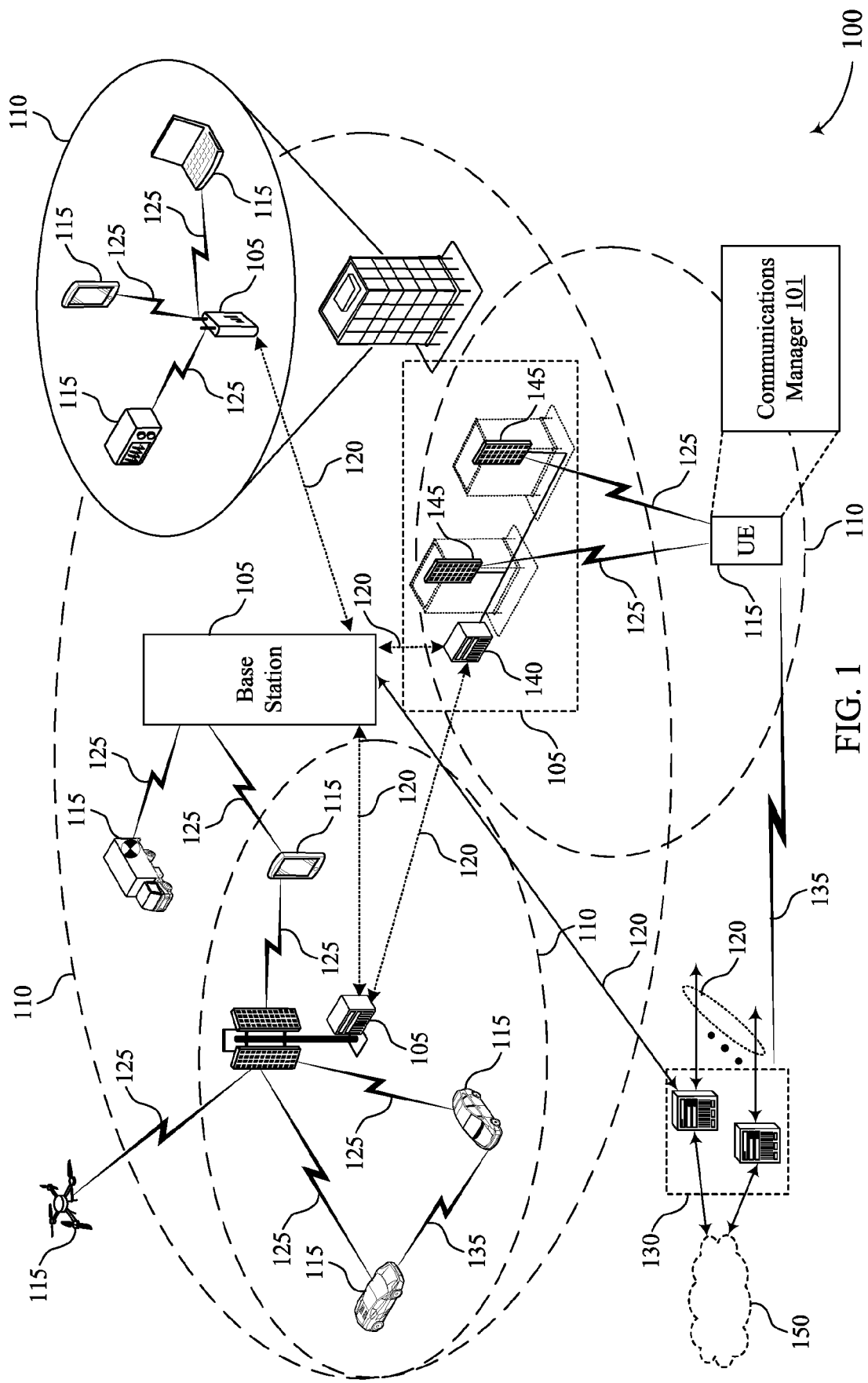
FIG. 1 illustrates an example of a wireless communications system that supports sensor performance indication in accordance with one or more aspects of the present disclosure.

FIG. 1 illustrates an example of a wireless communications system 100 that supports sensor performance indication in accordance with one or more aspects of the present disclosure. The wireless communications system 100 may include one or more base stations 105 (e.g., gNodeBs (gNBs), and/or radio heads (RHs)), one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. A UE 115 may communicate with the core network 130 through communication link 135.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, a UE 115 may include or be coupled with sensors that allow the UE 115 to sense various aspects of the conditions around the UE 115. For example, a UE 115 in a transportation environment (e.g., an environment in which one or more persons or vehicles is travelling) may include or be coupled with one or more cameras, lidar systems, radar systems, infrared systems, thermal sensors, etc., that provide information about the surroundings of the UE 115. The UE 115 may use the information gathered by its sensors to make various decisions, such as driving strategy decisions. To augment its understanding of the environment, the UE 115 may source sensor data from other devices. For example, the UE 115 may receive object detection information captured by sensors on other UEs 115 or base stations 105. Thus, the UE may increase its situational awareness by receiving sensor data that conveys information about a transportation environment, including information on road users, received objects, road impairments, and traffic events.

But in some cases, the sensor data received from another device may be unreliable due to performance limitations of the sensor that capture the data. For example, a device with a sensor that is configured to reliably detect objects up to ten meters away may report a detected object that is fifty meters away. If the receiving UE 115 does not know the performance limitations of the sensor that detected the object, the UE 115 may treat the sensor data as reliable data upon which decisions can be based, leading to suboptimal results.

According to the techniques described herein, a device that sends sensor data to another device (e.g., a UE 115) may also send information about the performance level of the sensor for various metrics. For example, the device may send a certification that indicates the accuracy, resolution, range, refresh rate, sensitivity, depth perception, and/or field-of-view of the sensor, among other metrics. The device may indicate the performance level(s) of a sensor in the same message that conveys data captured by the sensor or in a separate message. A device that receives the indication of the sensor's performance level(s) may use the performance level(s) to determine the reliability of the data captured by sensor so that the device can make informed decisions. One or more of these operations may be performed by a communications manager 101, which may be an example of a communications manager 1115, 1215, 1305, or 1410 as described with reference to FIGS. 11 through 14.

Figure 2:
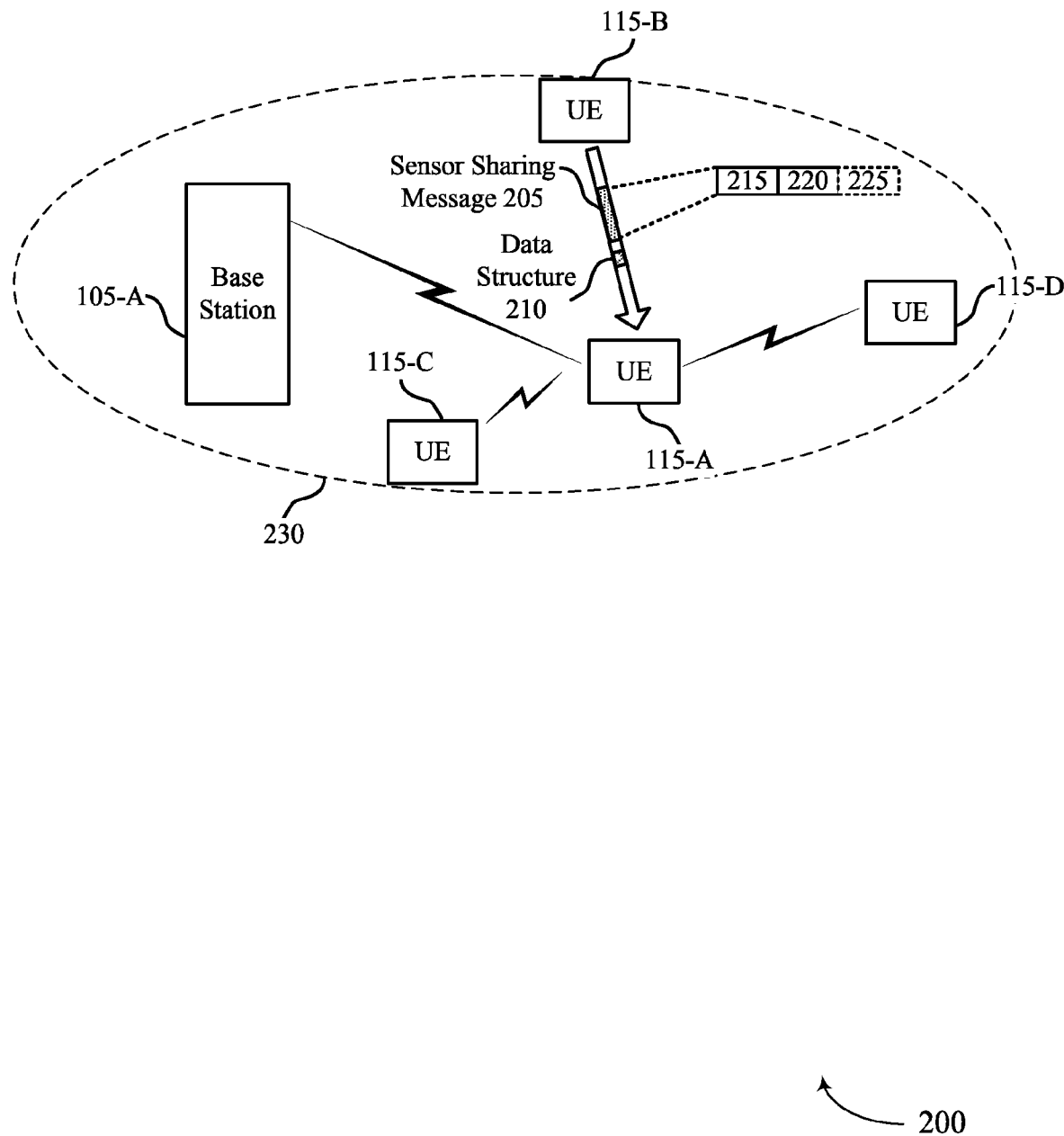
FIG. 2 illustrates an example of a wireless communications system that supports sensor performance indication in accordance with one or more aspects of the present disclosure.

FIG. 2 illustrates an example of a wireless communications system 200 that supports sensor performance indication in accordance with one or more aspects of the present disclosure. In some examples, wireless communications system 200 may implement aspects of wireless communication system 100. For example, wireless communications system 200 may include a base station 105-a and UEs 115-a through 115-d, which may be examples of a base station 105 and UEs 115, respectively, as described with reference to FIG. 1. The UEs 115 may be examples of roadside units (RSUs) or on-board-units (OBU).

The UEs 115 in wireless communications system 200 may directly communicate with each other (e.g., using vehicle-to-everything (V2X) communications, device-to-device (D2D) communications, etc.) to exchange information. For example, in a V2X system a UE 115 may use vehicle-to-vehicle (V2V) communications to communicate with a vehicle, vehicle-to-person (V2P) communications to communicate with a personal electronic device, or vehicle-to-infrastructure (V2I) communications to communicate with roadside infrastructure. In some cases, the V2X communications are facilitated by base station 105-a, which may communicate wireless devices that are within coverage area 230. Although described with reference to V2X, the techniques described herein may be implemented using any type of communication that allows one UE 115 to communicate directly with another UE 115.

The UEs 115 in wireless communications system 200 may exchange sensor sharing messages that convey sensor data about the conditions of a transportation environment. For example, UE 115-b may send to UE 115-a a sensor sharing message 205 that includes sensor data for a detected object. But the sensor data may not be reliable due to limitations of the sensors that collected the data. Although the sensor sharing message 205 may include a signature or certification of UE 115-b (e.g., the originator of the sensor sharing message 205), the sensor sharing message 205 may not include any information about the reliability of the sensor data. According to the techniques described herein, UE 115-a may send data structure 210 to UE 115-b so that UE 115-b can determine the reliability of the sensor data. The data structure 210 may carry performance information for the sensor and may be included in the sensor sharing message 205 or a separate message (e.g., a message that has a different transmission period than sensor sharing messages). In some cases, the message that includes data structure 210 may be an application-layer message.

The performance information conveyed by data structure 210 may include a certification of the sensor's performance. In some cases, the certification may include an indication of the performance level (e.g., the actual or expected capability) of the sensor for various metrics. But sending the exact performance level of a metric for a sensor may use many resources, so UE 115-b may conserve resources by sending an indication of a performance value (e.g., an integer number) that represents the performance level of one or more metrics for one or more sensors. UE 115-b may determine the performance value based on a set of rules that defines a mapping (or an "association") between performance levels of a sensor and performance values. In some cases, the set of rules is defined by a standards body so that all devices regulated by the standards body use the same set of rules. Thus, a device (e.g., UE 115-a) that receives a performance value for a sensor can convert the performance value into an actual or expected performance level of the sensor (e.g., a sensor that receives a performance value '1' may determine that the sensor has a range of x meters).

In some examples of wireless communications system 200, there may be multiple standards bodies (e.g., SAE, C-SAE, ESTI-ITS) that certify sensors and predefine the sets of rules described herein. So, a device (e.g., UE 115-b) that sends a sensor performance certification may also indicate the standards body (or "certifying authority") that applies to the device/sensor so that the receiving device knows to use the set of rules predefined by that standards body. Thus a common set of rules may be used by both devices, which allows for a consistent mapping between performance values and performance levels.

In some cases, the set of rules predefined by a standards body may include subsets of rules, each of which defines a unique mapping between performance values and performance levels. For example, the standards body may predefine four subsets of rules. The first subset of rules (which may be referred to as "metric-specific" rules) may map each performance value to a unique performance level for a given metric of a sensor. Thus, a sensor's performance level for each metric may be indicated by a separate performance value (e.g., a performance value w may indicate the sensor's range). The second subset of rules (which may be referred to as "sensor-specific" rules) may associate each performance value with a set of performance levels for a sensor, where each performance level corresponds to a different metric. Thus, a single performance value may indicate the performance levels of multiple metrics of a sensor (e.g., a performance value x may indicate the sensor's range and sensitivity).

The third subset of rules (which may be referred to as "fusion" rules) may map a performance value to an average performance level of multiple sensors for a given metric. Thus, a single performance value may indicate an average performance level for multiple sensors for a given metric (e.g., a performance value y may indicate the average range of multiple sensors). The fourth subset of rules (which may be referred to as "fusion aggregation" rules) may associate each performance value with a set of average performance levels for multiple sensors, where each average performance level corresponds to a different metric. Thus, a single performance value may indicate the average performance level for multiple metrics of multiple sensors (e.g., a performance value z may indicate the average range and average sensitivity of two or more sensors).

Because multiple subsets of rules may be predefined by a single standards body, a device (e.g., UE 115-a) that receives a performance value may need to know the subset of rules used to derive the performance value so that the device can use the same subset of rules to determine the associated performance level(s). Thus, UE 115-b may include an indication of the relevant subset of rules in data structure 210. In some cases, UE 115-b may also include the type of the sensor and the ID of the sensor in data structure 210. Although described with reference to four subsets of rules, the techniques described herein can be implemented with any number of rule subsets.

In some examples, the sensor data and sensor performance information transmitted by a device is associated with one or more local sensors of the device. However, it should be appreciated that the originator of a sensor sharing message and/or sensor information may not necessarily be the device that includes the relevant sensor. For example, the sensor sharing message 205 transmitted by UE 115-*b* may include sensor data captured by a sensor on a different device, such as UE 115-*d*. Similarly, the data structure 210 transmitted by UE 115-*d* may be for a sensor on a different device. Thus, in some cases, a device may act as a relay for sensor data and performance information associated with sensors on another device.

In some cases, the sensor sharing message 205 may include multiple parts. For example, the sensor sharing message may include a first part 215, a second part 220, and a third part 225. The first part 215 may convey host data (e.g., information about the originating device, such as the ID and various characteristics of the device). The second part 220 may convey sensor data about detected objects, such as type, position, speed, distance, direction, etc. of the object. In some cases, the second part 220 may include the ID of the sensor(s) that captured the sensor data. For example, the frame in part 220 that conveys sensor data for Object A may also convey the ID of the sensor that detected Object A, and the frame in part 220 that conveys sensor data for Object B may also convey the ID of the sensor that detected Object B. The ID of the sensors may match the IDs indicated in data structure 210. Thus, a device that receives data structure 210 may associate a particular set of sensor data with the sensor that captured that set of sensor data.

As noted, the data structure 210 may be included in a sensor sharing message 205 or a different message. When the data structure 210 is included in the sensor sharing message 205, the sensor sharing message 205 may include third part 225. The third part 225 may include a data structure 210 for different sensors or combinations of sensors. Each data structure 210 may include an indication of the ID(s) of the sensors associated with the data structure, and those IDs may match the ID(s) conveyed in part 220.

Figure 3:
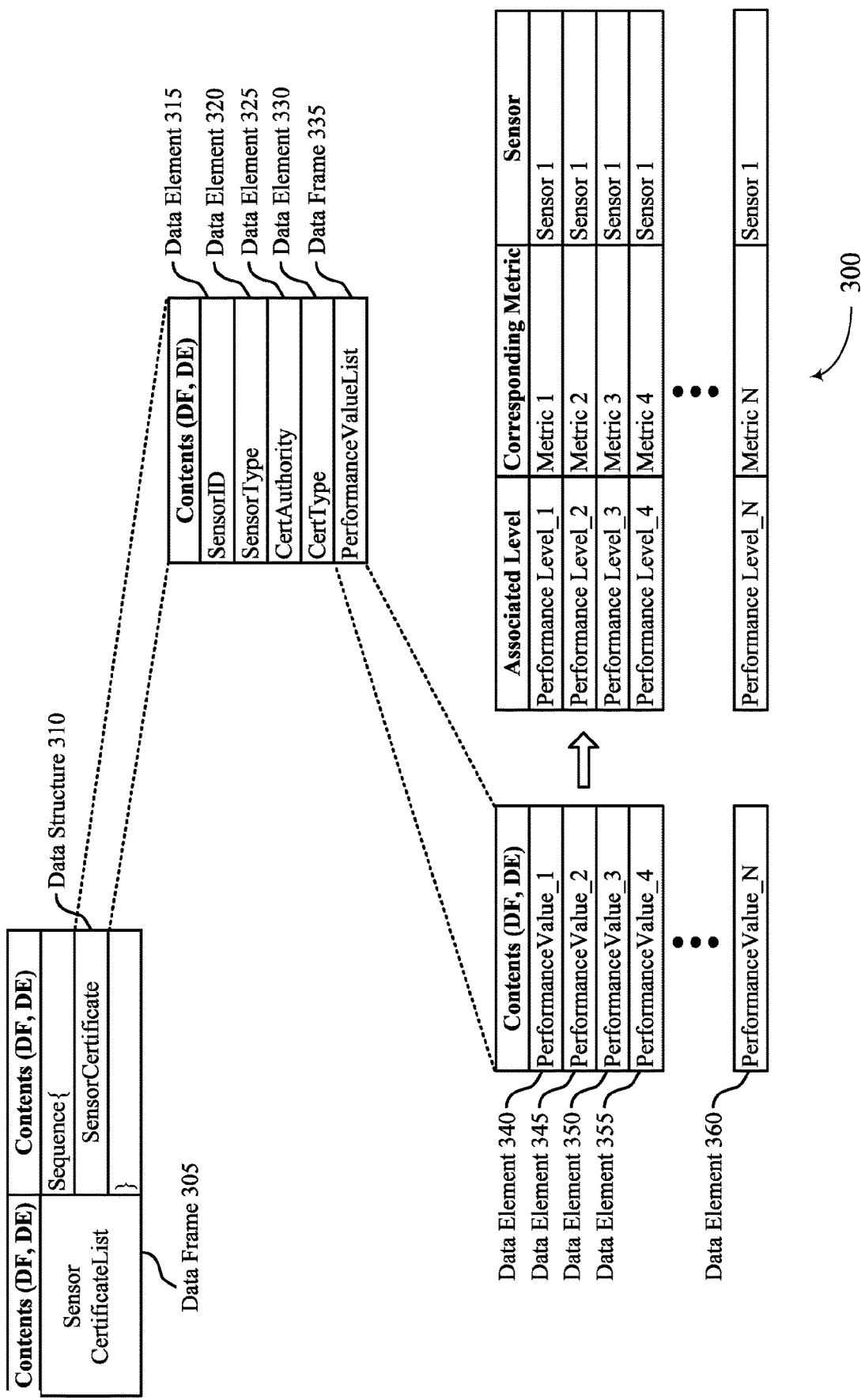
FIG. 3 illustrates an example of a data format that supports sensor performance indication in accordance with one or more aspects of the present disclosure.

FIG. 3 illustrates an example of a data format 300 that supports sensor performance indication in accordance with one or more aspects of the present disclosure. Data format 300 may be used by a device such as a UE 115 to separately indicate performance levels corresponding to different metrics of a sensor. Thus, data format 300 may be part of a sensor sharing process between two devices. In some cases, the device that transmits data format 300 may determine the performance values based on the first subset of rules (e.g., the metric-specific rules) as described with reference to FIG. 2. Accordingly, the device that receives data format 300 may determine the performance levels associated with the performance values based on the first subset of rules.

Data format 300 may include multiple data frames (DFs) and data elements (DEs). Each data frame may be made up of one or more data frames and/or data elements. Data format 300 may include a data frame 305 that conveys SensorCertificateList. SensorCertificateList may include a sequence of SensorCertificates that are conveyed in data structures 310. A data structure 310 may be an example of a data structure 210 as described with reference to FIG. 2. In the example illustrated in FIG. 3, each SensorCertificate may include information about a particular sensor. Thus, data structure 310 may include a number of data elements and data frames that convey sensor information for that sensor. Although shown with a single SensorCertificate, the SensorCertificateList may include multiple SensorCertificates, each associated with a different sensor.

Data structure 310 may include data elements 315 through 330 and data frame 335. Data element 315 may convey an indication of the ID of the sensor (e.g., SensorID) and data element 320 convey an indication of the type of the sensor (e.g., SensorType). Data element 325 may convey an indication of the certifying authority (e.g., standards body) that applies to the se430445nsor. Thus, data element 325 may convey an indication of the set of rules that applies to the sensor (e.g., the set of rules predefined by the certifying authority). Data element 330 may convey an indication of the subset of rules used by the device with the sensor. In the example depicted in FIG. 3, the indicated subset of rules may be the first subset of rules (e.g., the metric-specific rules) described with reference to FIG. 2. So, each performance value conveyed by data frame 335 may be associated with a unique performance level for a given metric of the sensor.

Data frame 335 may convey PerformanceValueList, which may be a list of performance values for the sensor. Thus, data frame 335 may include multiple data elements (e.g., data elements 340 through 355) each of which conveys a performance value (e.g., PerformanceValue_x) that is associated with a performance level of a unique metric. The association between the performance values and performance levels may be defined by the first subset of rules indicated by data element 325. Because the first subset of rules applies, the performance value PerformanceValue_1 may be associated with a first performance level (e.g., PerformanceLevel_1) corresponding to a first metric (e.g., Metric 1). Similarly, the performance value PerformanceValue_2 may be associated with a second performance level (e.g., PerformanceLevel_2) corresponding to a second metric (e.g., Metric 2). And so on and so forth. Thus, the performance level corresponding to a metric of a sensor may be indicated by a performance value that is carried in its own data element.

A device that receives data structure 310 may reference the various data frames and data elements to determine information about the sensor associated with data structure. For example, the device may determine the sensor's ID from the value conveyed in data element 315 (e.g., based on SensorID) and the device may determine the sensor's type (e.g., camera, radar, lidar, etc.) from the value conveyed in data element 320 (e.g., based on SensorType). The device may also determine the certifying authority (and thus the predefined set of rules) that applies to the indicated sensor based on the value conveyed in data element 330 (e.g., based on CertAuthority), as well as the subset of rules the device is to use based on the value conveyed in data element 325 (e.g., based on CertType).

As noted, the first subset of rules may define a one-to-one association between performance values and performance levels corresponding to different metrics of a particular sensor. Accordingly, the device may use the first subset of rules predefined by the indicated certifying authority to associate the performance value PerformanceValue_N with PerformanceLevel_N. The device may determine the metric corresponding to PerformanceLevel_N based on the position of the data element 360 in data frame 335. Thus, the device may determine that the performance level for metric N of Sensor 1 (e.g., the sensor indicated by SensorID) is PerformanceLevel_N.

Figure 4:
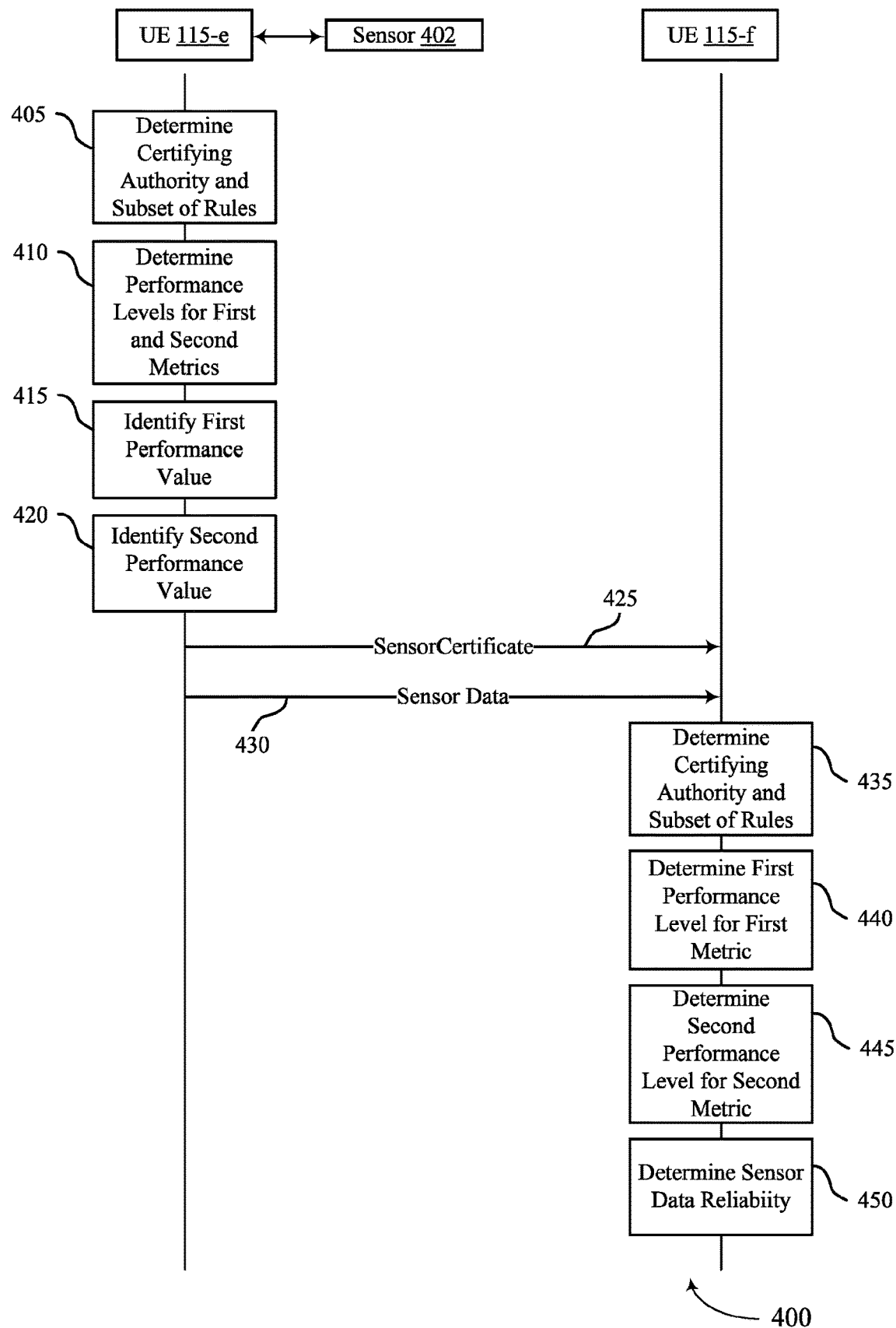
FIG. 4 illustrates an example of a process flow that supports sensor performance indication in accordance with one or more aspects of the present disclosure.

FIG. 4 illustrates an example of a process flow 400 that supports sensor performance indication in accordance with one or more aspects of the present disclosure. In some examples, process flow 400 may implement aspects of wireless communications systems 100 and 200. For example, process flow 400 may include UE 115-*e* and UE 115-*f*, and these devices may implement aspects of the sensor information sharing process described with reference to FIG. 3. Each UE 115 may include or be coupled with one or more sensors but for ease of illustration only sensor 402 is depicted.

In the following description of the process flow 400, the operations between UE 115-e and UE 115-f may occur in a different order than the exemplary order shown, or the operations performed by the devices may be performed in different orders or at different times. Certain operations may also be left out of the process flow 400, or other operations may be added to the process flow 400.

At 405, UE 115-e may determine a set of rules that apply to UE 115-e (or sensor 402) and the certifying authority that predefined the set of rules. UE 115-e may also determine a subset of rules that apply to UE 115-e (or its sensor 402). The subset of rules may be one of multiple subsets included in the set of rules. In the example illustrated in FIG. 4, the subset of rules may be the first subset of rules (e.g., the metric-specific rules) described with reference to FIGS. 2 and 3.

At 410, UE 115-e may determine a first performance level corresponding to a first metric of sensor 402. For example, UE 115-e may determine the sensitivity of sensor 402 which may be a camera, lidar sensor, radar sensor, etc. UE 115-e may also determine a second performance level corresponding to a second metric of the sensor 402. For example, UE 115-e may determine the range of sensor 402.

At 415, UE 115-e may identify a first performance value that is associated with the first performance level corresponding to the first metric. UE 115-e may identify the first performance value based on the first performance level and the subset of rules determined at 405. At 420, UE 115-e may identify a second performance value that is associated with the second performance level corresponding to the second metric. UE 115-e may identify the second performance value based on the second performance level and the subset of rules determined at 405.

At 425, UE 115-e may transmit a message that includes a SensorCertificate that indicates information about sensor 402. The SensorCertificate may be conveyed in a data structure such as the data structure 310 described with reference to FIG. 3. Thus, UE 115-e may transmit an indication of the first performance value in a first data element (e.g., data element 340) of the message and UE 115-e may transmit an indication of the second performance value in a second data element (data element 345) of the message. UE 115-e may also transmit an indication of the certifying authority's set of rules in a third data element (e.g., data element 325) of the message. UE 115-e may also transmit an indication of the subset of rules in a fourth data element (e.g., data element 330) of the message. UE 115-e may also transmit an indication of the ID of sensor 402 in a fifth data element (e.g., data element 315) of the message. UE 115-e may also transmit an indication of the type of sensor 402 in a sixth data element (e.g., data element 320) of the message.

At 430, UE 115-e may transmit sensor data captured by sensor 402. The sensor data may be included in a sensor sharing message that also includes the SensorCertificate for sensor 402. Alternatively, the SensorCertificate may be included in a different message than the sensor sharing message. In some examples, the sensor data may include an indication of the ID of the sensor that captured the sensor data. The ID may match the ID indicated in data element 315.

At 435, UE 115-f may determine the certifying authority and the set of rules based on the SensorCertificate (e.g., based on the value of CertAuthority carried in data element 325). UE 115-f may also determine the subset of rules based on the SensorCertificate (e.g., based on the value of Cert-Type carried in data element 330).

At 440, UE 115-f may determine the first performance level corresponding to the first metric of sensor 402. UE 115-f may determine the first performance level based on the first performance value and the subset of rules. At 445, UE 115-f may determine the second performance level corresponding to the second metric of sensor 402. UE 115-f may determine the second performance level based on the second performance value and the subset of rules. At 450, UE 115-f may determine the reliability of the sensor data captured by sensor 402 based on the first and second performance levels.

Although described with reference to sensor 402, process flow 400 may be implemented for a sensor that is on a device other than UE 115-e. In such cases, the sensor information determined and transmitted by UE 115-e may be based on sensor information received from the device that includes the sensor.

Figure 5:
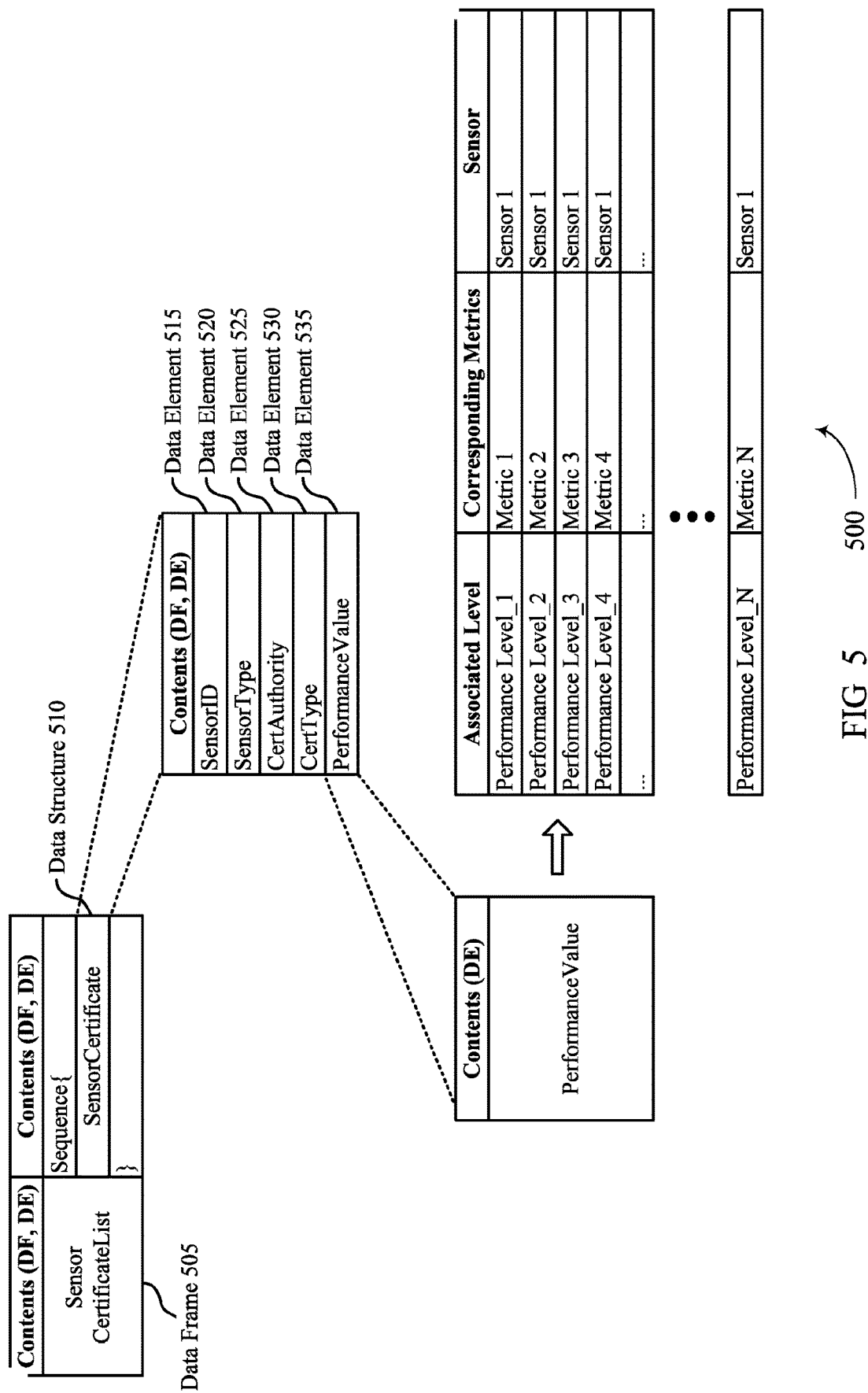
FIG. 5 illustrates an example of a data format that supports sensor performance indication in accordance with one or more aspects of the present disclosure.

FIG. 5 illustrates an example of a data format 500 that supports sensor performance indication in accordance with one or more aspects of the present disclosure. Data format 500 may be used by a device such as a UE 115 to indicate multiple performance levels corresponding to multiple metrics of a sensor using a single performance value. Thus, data format 500 may be part of a sensor sharing process between two devices. In some cases, the device that transmits data format 500 may determine the performance values based on the second subset of rules (e.g., the sensor-specific rules) as described with reference to FIG. 2. Accordingly, the device that receives data format 500 may determine the performance levels associated with the performance values based on the second subset of rules.

Data format 500 may include a data frame 505 that conveys SensorCertificateList. SensorCertificateList may include a sequence of SensorCertificates that are conveyed in data structures 510. A data structure 510 may be an example of a data structure 210 as described with reference to FIG. 2. In the example illustrated in FIG. 5, each SensorCertificate may include information about a particular sensor. Thus, data structure 510 may include a number of data elements and data frames that convey sensor information for that particular sensor. Although shown with a single SensorCertificate, the SensorCertificateList may include multiple SensorCertificates, each associated with a different sensor.

Data structure 510 may include data elements 515 through 530, which may be examples of corresponding data elements 315 through 330 described with reference to FIG. 3. Data structure 510 may also include data element 535, which may convey a performance value (e.g., PerformanceValue) for the sensor. The performance value may be associated with multiple performance levels corresponding to various metrics of the sensor. The association between the performance value and performance levels may be defined by the second subset of rules (e.g., the sensor-specific rules) indicated in data element 530. Because the second subset of rules applies, the performance value conveyed by data element 535 may be associated with a first performance level (e.g., Performance Level_1) corresponding to a first metric (e.g., Metric 1), a second performance level (e.g. PerformanceValue_2) corresponding to a second metric (e.g., Metric 2), and so on and so forth. Thus, the performance levels corresponding to multiple metrics may be indicated by a single performance value that is carried in its own data element (e.g., data element 535).

A device that receives data structure 510 may reference the various data frames and data elements to determine information about the sensor associated with the data structure 510. For example, the device may determine the sensor's ID from the value (e.g., based on SensorID) conveyed in data element 515 and the device may determine the sensor's type from the value (e.g., based on SensorType) conveyed in data element 520. The device may also determine the certifying authority (and thus a predefined set of rules) that applies to the indicated sensor based on the value (e.g., based on CertAuthority) conveyed in data element 525, as well as the subset of rules the device is to use based on the value (e.g., based on CertType) conveyed in data element 535.

As noted, the second subset of rules (e.g., the sensor-specific rules) may define the association between a performance value and multiple performance levels corresponding to different metrics of a particular sensor. Accordingly, the device may use the second subset of rules predefined by the indicated certifying authority to associate the performance value conveyed by data element 535 with performance levels Performance Level_1 through Performance Level_N. The device may also determine the metric corresponding to each performance level based on the subset of rules. Thus, the device may determine that Sensor 1 (e.g., the sensor indicated by SensorID) has Performance Level_1 corresponding to metric 1 (e.g., range), Performance Level 2 corresponding to metric 2 (e.g., sensitivity), Performance Level_3 corresponding to metric 3 (e.g., resolution), Performance Level_4 corresponding metric 4 (accuracy), and a Performance Level_N corresponding to metric N (e.g., refresh rate).

Figure 6:
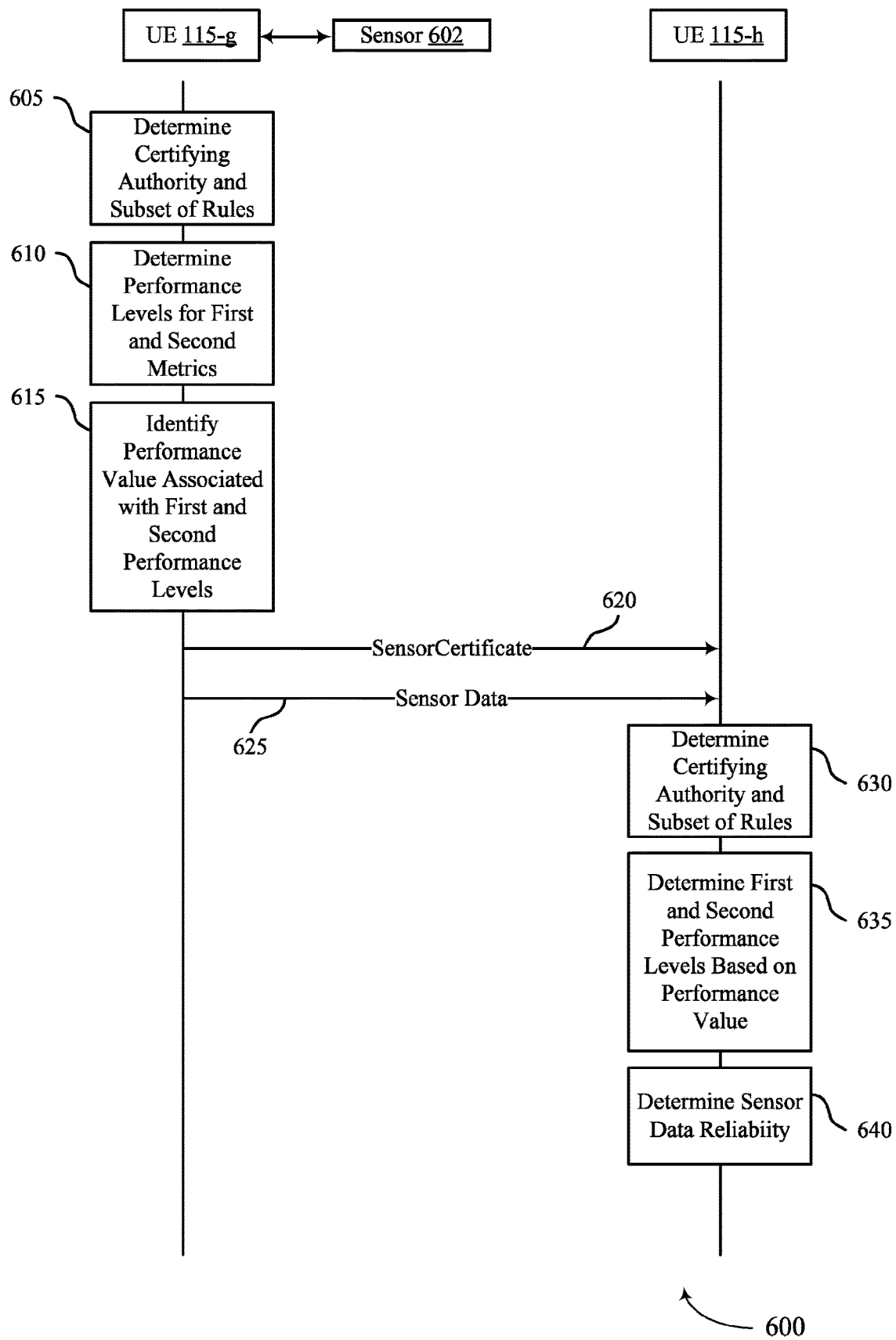
FIG. 6 illustrates an example of a process flow that supports sensor performance indication in accordance with one or more aspects of the present disclosure.

FIG. 6 illustrates an example of a process flow 600 that supports sensor performance indication in accordance with one or more aspects of the present disclosure. In some examples, process flow 600 may implement aspects of wireless communications systems 100 and 200. For example, process flow 600 may include UE 115-g and UE 115-h, and these devices may implement aspects of the sensor information sharing process described with reference to FIG. 5. Each UE 115 may include or be coupled with one or more sensors, but for ease of illustration only sensor 602 is depicted.

In the following description of the process flow 600, the operations between UE 115-g and UE 115-h may occur in a different order than the exemplary order shown, or the operations performed by the devices may be performed in different orders or at different times. Certain operations may also be left out of the process flow 600, or other operations may be added to the process flow 600.

At 605, UE 115-g may determine a set of rules that apply to UE 115-g (or sensor 602) and the certifying authority that predefined the set of rules. UE 115-g may also determine a subset of rules that apply to UE 115-g (or its sensor 602). The subset of rules may be one of multiple subsets included in the set of rules. In the example illustrated in FIG. 6, the subset of rules may be the second subset of rules (e.g., the sensor-specific rules) described with reference to FIGS. 2 and 5.

At 610, UE 115-g may determine a first performance level corresponding to a first metric of sensor 602. For example, UE 115-g may determine the resolution of sensor 602. UE 115-g may also determine a second performance level corresponding to a second metric of the sensor 602. For example, UE 115-g may determine the accuracy of sensor 602.

At 615, UE 115-g may identify a performance value that is associated with the first performance level corresponding to the first metric and the second performance level corresponding to the second metric. Thus, UE 115-g may identify the performance value based on the first and second performance levels and the subset of rules determined at 605.

At 620, UE 115-g may transmit a message that includes a SensorCertificate indicating information about sensor 602. The SensorCertificate may be conveyed by a data structure such as the data structure 510 described with reference to FIG. 5. Thus, UE 115-g may transmit an indication of the performance value in a first data element (e.g., data element 535) of the message. UE 115-g may also transmit an indication of the certifying authority's set of rules (e.g., in data element 525), an indication of the subset of rules (e.g., in data element 530), an indication of the ID of sensor 602 (e.g., in data element 515), and/or an indication of the type of sensor 602 (e.g., in data element 520).

At 625, UE 115-g may transmit sensor data captured by sensor 602. The sensor data may be included in a sensor sharing message that also includes the SensorCertificate for sensor 602. Alternatively, the SensorCertificate may be included in a different message than the sensor sharing message. In some examples, the sensor data may include an indication of the ID of the sensor that captured the sensor data. The ID may match the ID indicated in data element 515.

At 630, UE 115-h may determine the certifying authority and the set of rules based on the SensorCertificate (e.g., based on the value of CertAuthority carried in data element 525). UE 115-h may also determine the subset of rules based on the SensorCertificate (e.g., based on the value of CertType carried in data element 530).

At 635, UE 115-h may determine the first performance level corresponding to the first metric of sensor 602. UE 115-h may determine the first performance level based on the performance value and the subset of rules. UE 115-h may also determine the second performance level corresponding to the second metric of sensor 602. UE 115-h may determine the second performance level based on the performance value and the subset of rules. At 640, UE 115-h may determine the reliability of the sensor data captured by sensor 602 based on the first and second performance levels.

Although described with reference to sensor 602, process flow 600 may be implemented for a sensor that is on a device other than UE 115-g. In such cases, the sensor information determined and transmitted by UE 115-g may be based on sensor information received from the device that includes the sensor.

Figure 7:
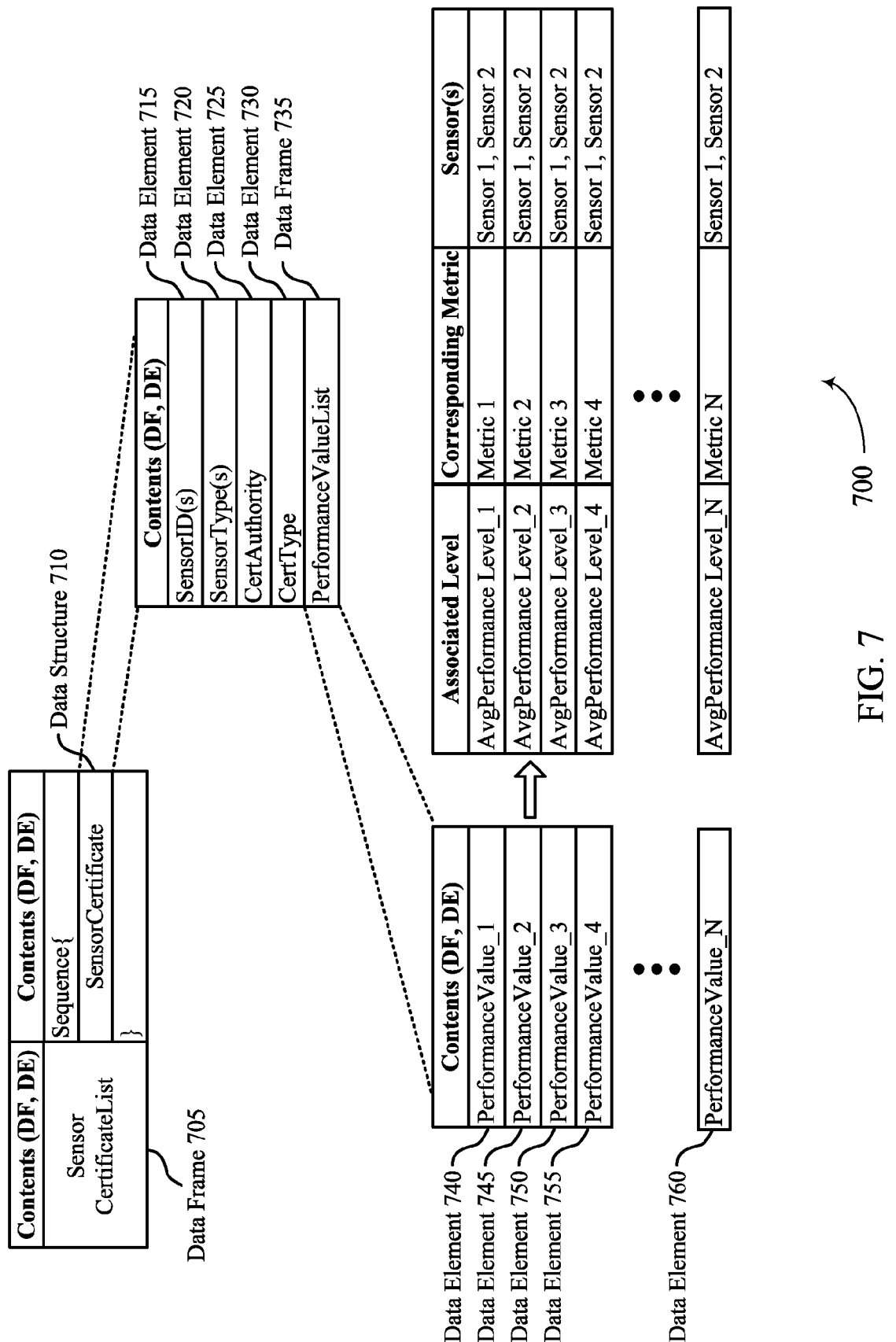
FIG. 7 illustrates an example of a data format that supports sensor performance indication in accordance with one or more aspects of the present disclosure.

FIG. 7 illustrates an example of a data format 700 that supports sensor performance indication in accordance with one or more aspects of the present disclosure. Data format 700 may be used by a device such as a UE 115 to indicate an average performance level corresponding to a metric of multiple sensors using a single performance value. Thus, data format 700 may be part of a sensor sharing process between two devices. In some cases, the device that transmits data format 700 may determine the indicated performance value based on the third subset of rules (e.g., the fusion rules) as described with reference to FIG. 2. Accordingly, the device that receives data format 700 may determine the average performance level associated with the performance value based on the third subset of rules.

Data format 700 may include a data frame 705 that conveys SensorCertificateList. SensorCertificateList may include a sequence of SensorCertificates that are conveyed in data structures 710. A data structure 710 may be an example of a data structure 210 as described with reference to FIG. 2. In the example illustrated in FIG. 7, each SensorCertificate may include information about multiple sensors. Thus, data structure 710 may include a number of data elements and data frames that convey sensor information for those sensors. Although shown with a single SensorCertificate, SensorCertificateList may include multiple SensorCertificates each of which is associated with multiple sensors.

Data structure 710 may include data elements 715 through 730, which may be examples of corresponding data elements 315 through 330 described with reference to FIG. 3. In some cases, the SensorCertificate may include multiple data elements 715 so that multiple sensor IDs can be indicated. For example, when the SensorCertificate is associated with two sensors the SensorCertificate may include a first data element that carries an indication of the ID of the first sensor (e.g., Sensor 1) and a second data element that carries an indication of the ID of the second sensor (e.g., Sensor 2). The SensorCertificate may also include multiple data elements 720 so that multiple sensor types can be indicated. For example, when the SensorCertificate is associated with two sensors the SensorCertificate may include a first data element that carries an indication of the type of the first sensor (e.g., Sensor 1) and a second data element that carries an indication of the ID of the second sensor (e.g., Sensor 2). Although described with reference to two sensors, the techniques described with reference to FIG. 7 may be implemented for any number of sensors.

The SensorCertificate may also include one or more data frames 735. Each data frame 735 may convey PerformanceValueList, which may be a list of performance values for multiple sensors. Thus, data frame 735 may include multiple data elements (e.g., data elements 740 through 755805) each of which conveys a performance value (e.g., PerformanceValue_x) that is associated with an average performance level of a metric of multiple sensors. The association between the performance values and average performance levels may be defined by the third subset of rules (e.g., the fusion rules) indicated by data element 725. Because the third subset of rules applies, the performance value PerformanceValue_1 may be associated with a first average performance level PerformanceLevel_1 corresponding to a first metric (e.g., Metric 1) of multiple sensors (e.g., Sensor 1 and Sensor 2). And the second performance value PerformanceValue_2 may be associated with a second average performance level corresponding to a second metric (e.g., Metric 2) of multiple sensors (e.g., Sensor 1 and Sensor 2). And so on and so forth. Thus, the average performance level corresponding to a metric for multiple sensors may be indicated by a performance value that is carried in its own data element.

A device that receives data structure 710 may reference the various data frames and data elements to determine information about the sensor associated with the data structure 710. For example, the device may determine the sensors' IDs based on the values conveyed in data elements 715 (e.g., based on SensorIDs) and the device may determine the sensors' types based on the value conveyed in data elements 720 (e.g., based on SensorTypes). The device may also determine the certifying authority (and thus a predefined set of rules) that applies to the indicated sensor based on the value conveyed in data element 725 (e.g., based on CertAuthority), as well as the subset of rules the device is to use based on the value conveyed in data element 725 (e.g., based on CertType).

As noted, the third subset of rules may define the association between performance values and average performance levels corresponding to different metrics of multiple sensors. Accordingly, the device may use the third subset of rules predefined by the indicated certifying authority to associate the performance value PerformanceValue_N conveyed in data element 760 with AvgPerformanceLevel_N. The device may also determine the metric corresponding to the performance level based on the position of element 760 in data frame 735. Thus, the device may determine that Sensor 1 and Sensor 2 (e.g., the sensors indicated by the SensorIDs) have an average performance level of AvgPerformanceLevel_N for metric N.

Figure 8:
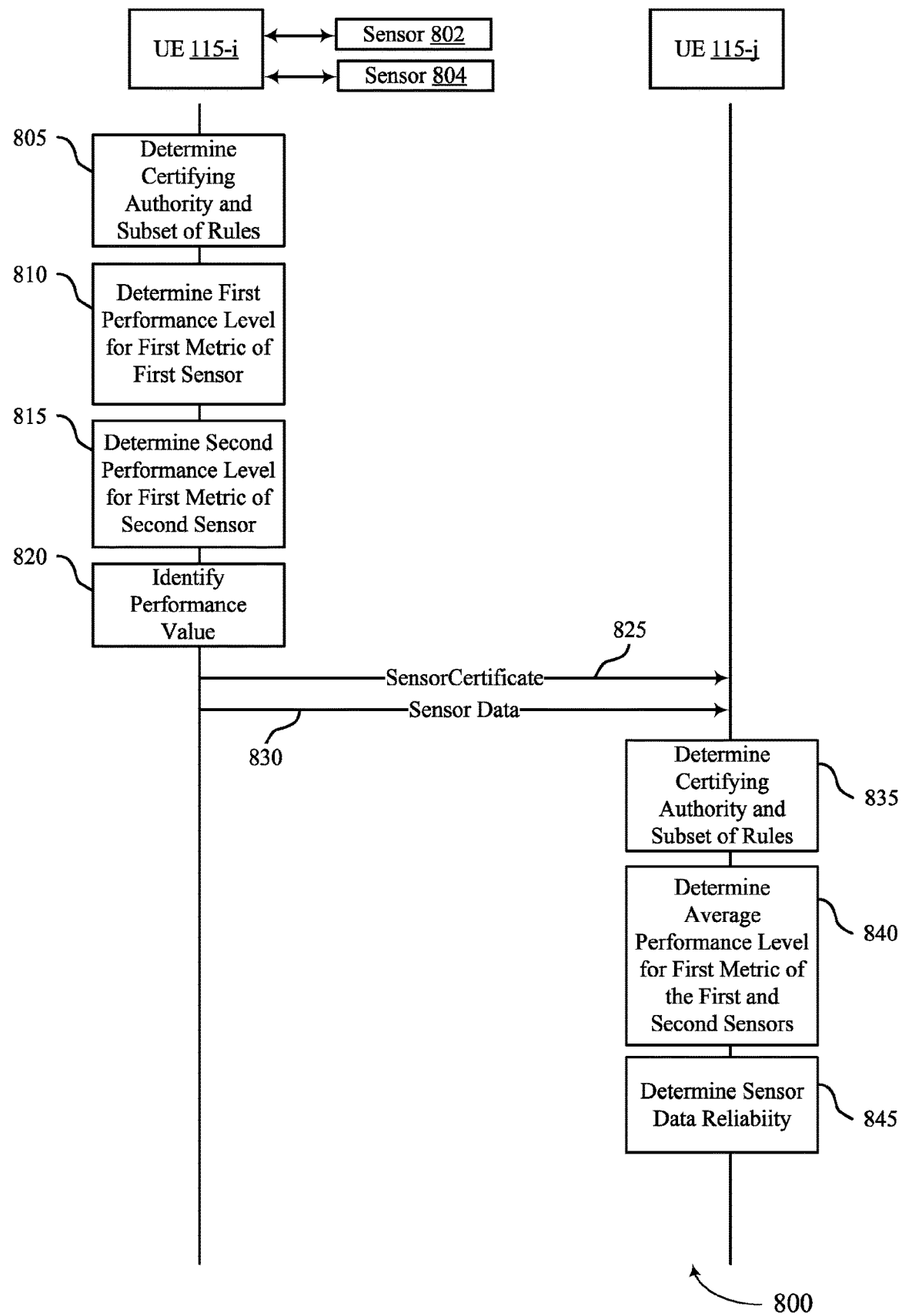
FIG. 8 illustrates an example of a process flow that supports sensor performance indication in accordance with one or more aspects of the present disclosure.

FIG. 8 illustrates an example of a process flow 800 that supports sensor performance indication in accordance with one or more aspects of the present disclosure. In some examples, process flow 800 may implement aspects of wireless communications systems 100 and 200. For example, process flow 800 may include UE 115-i and UE 115-j, and these devices may implement aspects of the sensor information sharing process described with reference to FIG. 7. Each UE 115 may include or be coupled with one or more sensors, but for ease of illustration only sensor 802 and sensor 804 are depicted.

In the following description of the process flow 800, the operations between UE 115-i and UE 115-j may occur in a different order than the exemplary order shown, or the operations performed by the devices may be performed in different orders or at different times. Certain operations may also be left out of the process flow 800, or other operations may be added to the process flow 800.

At 805, UE 115-i may determine a set of rules that apply to UE 115-i (or sensors 802, 804) and the certifying authority that predefined the set of rules. UE 115-i may also determine a subset of rules that apply to UE 115-g (or sensors 802, 804). The subset of rules may be one of multiple subsets included in the set of rules. In the example illustrated in FIG. 8, the subset of rules may be the third subset of rules (e.g., the fusion rules) described with reference to FIGS. 2 and 7.

At 810, UE 115-i may determine a first performance level corresponding to a first metric of a first sensor. For example, UE 115-i may determine the field-of-view of sensor 802. At 815 UE 115-i may determine a second performance level corresponding to the first metric of a second sensor. For example, UE 115-i may determine the field-of-view of sensor 804.

At 820, UE 115-i may identify a performance value based on a combination of the first performance level corresponding to the first metric of sensor 802 and the second performance level corresponding to the first metric of sensor 804. For example, UE 115-i may determine the average performance level for the first metric based on the first performance level and the second performance level. Upon determining the average performance level for sensor 802 and sensor 804, UE 115-i may identify the performance value corresponding to the average performance level. Thus, UE 115-g may identify the performance value based on a combination of the first and second performance levels and the subset of rules determined at 805.

At 825, UE 115-i may transmit a message that includes a SensorCertificate indicating information about sensors 802 and 804. The SensorCertificate may be conveyed by a data structure such as the data structure 710 described with reference to FIG. 7. Thus, UE 115-i may transmit an indication of the performance value in a first data element (e.g., data element 740) of the message. UE 115-i may also transmit an indication of the certifying authority's set of rules (e.g., in data element 725), an indication of the subset of rules (e.g., in data element 730), an indication of the IDs of sensors 802 and 804 (e.g., in data elements 715), and/or an indication of the types of sensors 802 and 804 (e.g., in data elements 720).

At 830, UE 115-*i* may transmit sensor data captured by sensor 802. The sensor data may be included in a sensor sharing message that also includes the SensorCertificate for sensor 602. Alternatively, the SensorCertificate may be included in a different message than the sensor sharing message. In some examples, the sensor data may include an indication of the ID of the sensor that captured the sensor data. The ID may match the ID indicated in data element 715.

At 835, UE 115-*j* may determine the certifying authority and the set of rules based on the SensorCertificate (e.g., based on the value of CertAuthority carried in data element 725). UE 115-*j* may also determine the subset of rules based on the SensorCertificate (e.g., based on the value of Cert-Type carried in data element 730).

At 840, UE 115-*h* may determine the average performance level corresponding to the first metric of sensor 802 and sensor 804. UE 115-*h* may determine the average performance level based on the performance value and the subset of rules. At 845, UE 115-*h* may determine the reliability of the sensor data captured by sensor 802 and sensor 804 based on the average performance level.

Although described with reference to sensor 802 and sensor 804, process flow 800 may be implemented for a sensor that is on a device other than UE 115-*i*. In such cases, the sensor information determined and transmitted by UE 115-*i* may be based on sensor information received from the device that includes the sensor.

Figure 9:
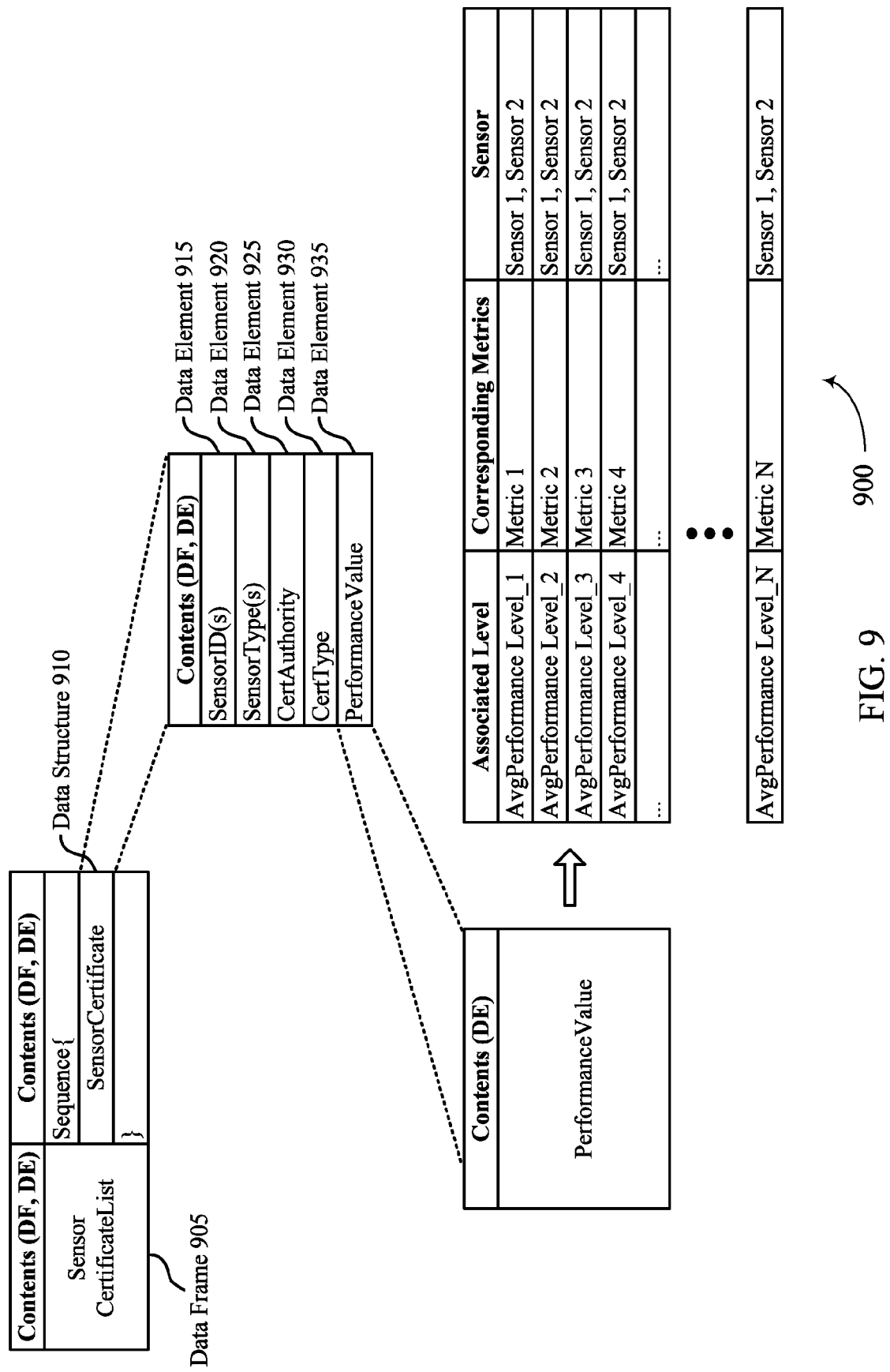
FIG. 9 illustrates an example of a data format that supports sensor performance indication in accordance with one or more aspects of the present disclosure.

FIG. 9 illustrates an example of a data format 900 that supports sensor performance indication in accordance with one or more aspects of the present disclosure. Data format 900 may be used by a device such as a UE 115 to indicate multiple average performance levels corresponding to multiple metrics of multiple sensors using a single performance value. Thus, data format 900 may be part of a sensor sharing process between two devices. In some cases, the device that transmits data format 900 may determine the performance values based on the fourth subset of rules (e.g., the fusion-aggregation rules) as described with reference to FIG. 2. Accordingly, the device that receives data format 900 may determine the average performance levels associated with the performance values based on the fourth subset of rules.

Data format 900 may include a data frame 905 that conveys SensorCertificateList. SensorCertificateList may include a sequence of SensorCertificates that are conveyed in data structures 910. A data structure 910 may be an example of a data structure 210 as described with reference to FIG. 2. In the example, illustrated in FIG. 9, each SensorCertificate may include information about multiple sensors. Thus, data structure 910 may include a number of data elements and data frames that convey sensor information for those sensors. Although shown with a single SensorCertificate, SensorCertificateList may include multiple SensorCertificates, each of which is associated with multiple sensors.

Data structure 910 may include data elements 915 through 930, which may be examples of corresponding data elements 315 through 330 described with reference to FIG. 3. In some cases, the SensorCertificate may include multiple data elements 915 so that multiple sensor IDs can be indicated. For example, when the SensorCertificate is associated with two sensors the SensorCertificate may include a first data element that carries an indication of the ID of the first sensor (e.g., Sensor 1) and a second data element that carries an indication of the ID of the second sensor (e.g., Sensor 2). The SensorCertificate may also include multiple data elements 920 so that multiple sensor types can be indicated. For example, when the SensorCertificate is associated with two sensors the SensorCertificate may include a first data element that carries an indication of the type of the first sensor (e.g., Sensor 1) and a second data element that carries an indication of the ID of the second sensor (e.g., Sensor 2). Although described with reference to two sensors, the techniques described with reference to FIG. 9 may be implemented for any number of sensors.

The SensorCertificate may also include data element 935, which carry an indication of a performance value (e.g., PerformanceValue) that is associated with multiple average performance levels corresponding to different metrics. The association between the performance value and average performance levels may be defined by the fourth subset of rules indicated in data element 925. Because the fourth subset of rules applies (e.g., the fusion-aggregation rules), the performance value may be associated with a first average performance level (e.g., AvgPerformanceLevel_1) corresponding to a first metric (e.g., Metric 1) of multiple sensors (e.g., Sensor 1 and Sensor 2). The performance value may also be associated with a second average performance level (e.g. AvgPerformanceValue_2) corresponding to a second metric (e.g., Metric 2) of multiple sensors (e.g., Sensor 1 and Sensor 2). And so on and so forth. Thus, the average performance levels corresponding to multiple metrics of multiple devices may be indicated by a single performance value that is carried in its own data element (e.g., data element 935).

A device that receives the data structure 910 may reference the various data frames and data elements to determine information about the sensors associated with the data structure. For example, the device may determine the sensors' IDs based on the value(s) conveyed in data element(s) 915 (e.g., based on SensorID(s)) and the device may determine the sensors' types based on the value(s) conveyed in data element(s) 720 (e.g., based on SensorType(s)). The device may also determine the certifying authority (and thus a predefined set of rules) that applies to the indicated sensors based on the value conveyed in data element 925 (e.g., based on CertAuthority), as well as the subset of rules the device is to use based on the value conveyed in data element 935 (e.g., based on CertType).

As noted, the fourth subset of rules may define the association between a performance value and multiple average performance levels corresponding to different metrics of multiple sensors. Accordingly, the device may use the fourth subset of rules predefined by the indicated certifying authority to associate the performance value conveyed by data element 935 with average performance levels AvgPerformanceLevel_1 through AvgPerformanceLevel_N. The device may determine the metric corresponding to each average performance level based on the subset of rules indicated by data element 930. Thus, the device may determine that the average performance level corresponding to Metric 1 of Sensor 1 and Sensor 2 is AvgPerformanceLevel_1, the average performance level corresponding to Metric 2 of Sensor 1 and Sensor 2 is AvgPerformanceLevel_2 the average performance level corresponding to Metric 3 of Sensor 1 and Sensor 2 is AvgPerformanceLevel_3, the average performance level corresponding to Metric 4 of Sensor 1 and Sensor 2 is AvgPerformanceLevel_4, and the average performance level corresponding to Metric N of Sensor 1 and Sensor 2 is AvgPerformanceLevel_N.

Figure 10:
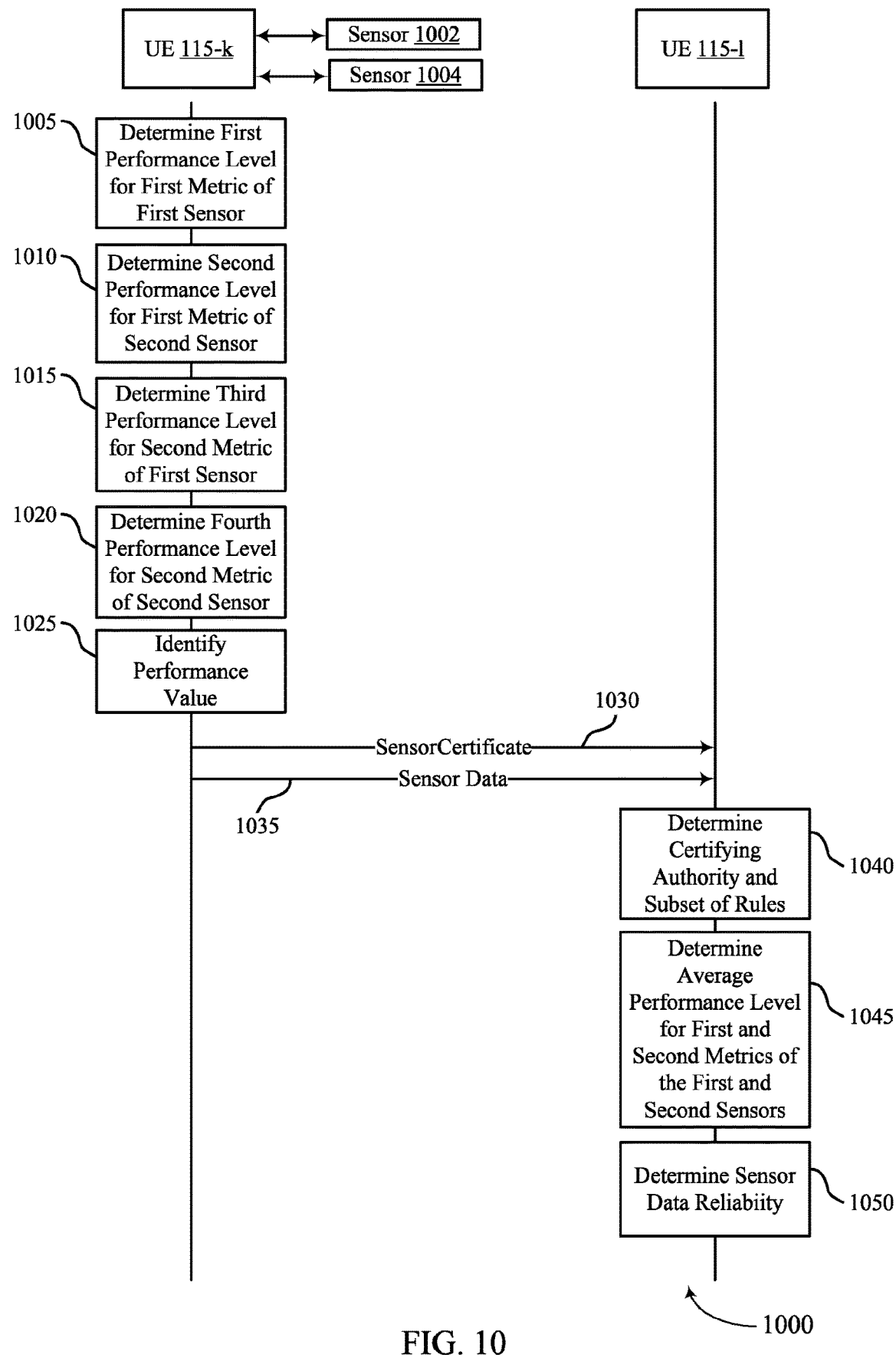
FIG. 10 illustrates an example of a process flow that supports sensor performance indication in accordance with one or more aspects of the present disclosure.

FIG. 10 illustrates an example of a process flow 1000 that supports sensor performance indication in accordance with one or more aspects of the present disclosure. In some examples, process flow 1000 may implement aspects of wireless communications systems 100 and 200. For example, process flow 1000 may include UE 115-*k* and UE 115-*l*, and these devices may implement aspects of the sensor information sharing process described with reference to FIG. 9. Each UE 115 may include or be coupled with one or more sensors, but for ease of illustration only sensor 1002 and sensor 1004 are depicted.

In the following description of the process flow 1000, the operations between UE 115-*k* and UE 115-*l* may occur in a different order than the exemplary order shown, or the operations performed by the devices may be performed in different orders or at different times. Certain operations may also be left out of the process flow 1000, or other operations may be added to the process flow 1000.

Prior to 1005, UE 115-*k* may determine a set of rules that apply to UE 115-*k* (or sensors 1002, 1004) and the certifying authority that predefined the set of rules. UE 115-*k* may also determine a subset of rules that apply to UE 115-*k* (or sensors 1002, 1004). The subset of rules may be one of multiple subsets included in the set of rules. In the example illustrated in FIG. 10, the subset of rules may be the fourth subset of rules (e.g., the fusion-aggregation rules) described with reference to FIGS. 2 and 9.

At 1005, UE 115-*k* may determine a first performance level corresponding to a first metric of a first sensor. For example, UE 115-*k* may determine the depth perception of sensor 1002. At 1010, UE 115-*k* may determine a second performance level corresponding to the first metric of a second sensor. For example, UE 115-*k* may determine the depth perception of sensor 1004.

At 1015, UE 115-*k* may determine a third performance level corresponding to a second metric of the first sensor. For example, UE 115-*k* may determine the range of sensor 1002. At 1020, UE 115-*k* may determine a fourth performance level corresponding to the second metric of the second sensor. For example, UE 115-*k* may determine the range of sensor 1004.

At 1025, UE 115-*k* may identify a performance value based on a combination of the first, second, third, and fourth performance levels. For example, UE 115-*k* may determine the average performance level for the first metric based on the first performance level and the second performance level. And UE 115-*k* may determine the average performance level for the second metric based on the third performance level and the fourth performance level. Upon determining the average performance levels for first and second metrics, UE 115-*k*, may identify the performance value that is associated with the average performance levels. Thus, UE 115-*k* may identify the performance value based on a combination of the first, second, third, and fourth performance levels and the subset of rules.

At 1030, UE 115-*k* may transmit a message that includes a SensorCertificate indicating information about sensors 1002 and 1004. The SensorCertificate may be conveyed by a data structure 910 as described with reference to FIG. 9. Thus, UE 115-*k* may transmit an indication of the performance value in a first data element (e.g., data element 935) of the data structure. UE 115-*k* may also transmit an indication of the certifying authority's set of rules (e.g., in data element 925), an indication of the subset of rules (e.g., in data element 930), an indication of the IDs of sensors 1002 and 1004 (e.g., in data elements 915), and/or an indication of the types of sensors 1002 and 1004 (e.g., in data elements 920).

At 1035, UE 115-*k* may transmit sensor data captured by sensor 1002 and sensor 1004. The sensor data may be included in a sensor sharing message that also includes the SensorCertificate for sensor 1002 and sensor 1004. Alternatively, the SensorCertificate may be included in a different message than the sensor sharing message. In some examples, the sensor data may include an indication of the ID of the sensor that captured the sensor data. The ID may match the ID indicated in data element 915.

At 1040, UE 115-*l* may determine the certifying authority and the set of rules based on the SensorCertificate (e.g., based on the value of CertAuthority carried in data element 925). UE 115-*l* may also determine the subset of rules based on the SensorCertificate (e.g., based on value of CertType carried in data element 930).

At 1045, UE 115-*l* may determine the first average performance level corresponding to the first metric of sensor 1002 and sensor 1004. UE 115-*l* may determine the first average performance level based on the performance value and the subset of rules. UE 115-*l* may also determine the second average performance level corresponding to the second metric of sensor 1002 and sensor 1004. UE 115-*l* may determine the second average performance level based on the performance value and the subset of rules. At 1050, UE 115-*l* may determine the reliability of the sensor data captured by sensor 1002 and sensor 1004 based on the first and second average performance levels.

Although described with reference to sensor 1002 and sensor 1004, process flow 1000 may be implemented for sensors that are on a device other than UE 115-*k*. In such cases, the sensor information determined and transmitted by UE 115-*k* may be based on sensor information received from the device that includes the sensor.

Figure 11:
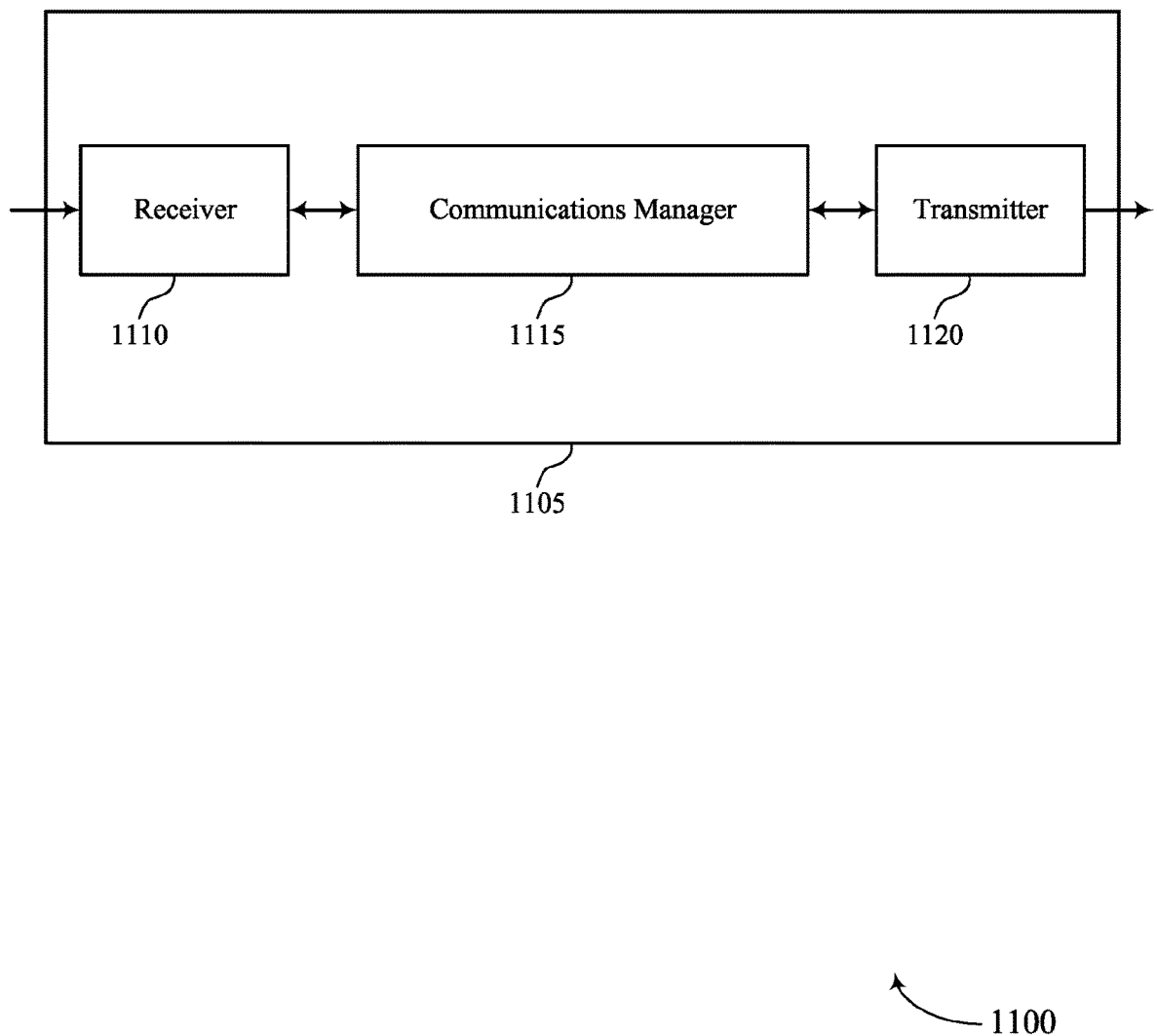
FIGS. 11 and 12 show block diagrams of devices that support sensor performance indication in accordance with one or more aspects of the present disclosure.

FIG. 11 shows a block diagram 1100 of a device 1105 that supports sensor performance indication in accordance with one or more aspects of the present disclosure. The device 1105 may be an example of aspects of a UE 115 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to sensor performance indication, etc.). Information may be passed on to other components of the device 1105. The receiver 1110 may be an example of aspects of the transceiver 1420 described with reference to FIG. 14. The receiver 1110 may utilize a single antenna or a set of antennas.

In some cases, the device 1105 may be a device that transmits sensor information to another device as described herein. In such cases, the communications manager 1115 may identify a configured set of one or more rules that apply to a sensor configured to monitor one or more conditions, the configured set of one or more rules defining an association between a set of performance values and a set of performance levels corresponding to one or more metrics of the sensor; identify a performance value from the set of performance values for the sensor based on a performance level of the sensor and the configured set of one or more rules; and transmit, to a second wireless device, an indication of the configured set of one or more rules for the sensor in a message and an indication of the performance value for the sensor in the message. The communications manager 1115 may be an example of aspects of the communications manager 1410 described herein.

In some cases, the device 1105 may be a device that receives sensor information from another device as described herein. In such cases, the communications manager 1115 may receive, in a message, an indication of a configured set of one or more rules that applies to a sensor configured to monitor one or more conditions, the configured set of one or more rules defining an association between a set of performance values and a set of performance levels corresponding to one or more metrics of the sensor; receive an indication of a performance value for the sensor in the message; and identify a performance level of the sensor based on the performance value and the configured set of one or more rules.

The actions performed by the communications manager 1115 as described herein may be implemented to realize one or more potential advantages. For example, the operations of communications manager 1115 may allow a device to signal the capabilities of its sensor(s) to other devices. This information in turn may allow a device that receives sensor data captured by the sensor(s) to determine the reliability of the sensor data. Additionally, the manner of indicating the sensor information may conserve resources (e.g., be more efficient) compared to other techniques. For example, indicating performance values rather than performance levels may use fewer communications resources (e.g., time and frequency resources) because fewer bits of data are transmitted. Transmitting fewer bits of data may also reduce power consumption of the devices participating in the exchange because the transceivers on the devices turned off sooner (compared to transmitting more bits).

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
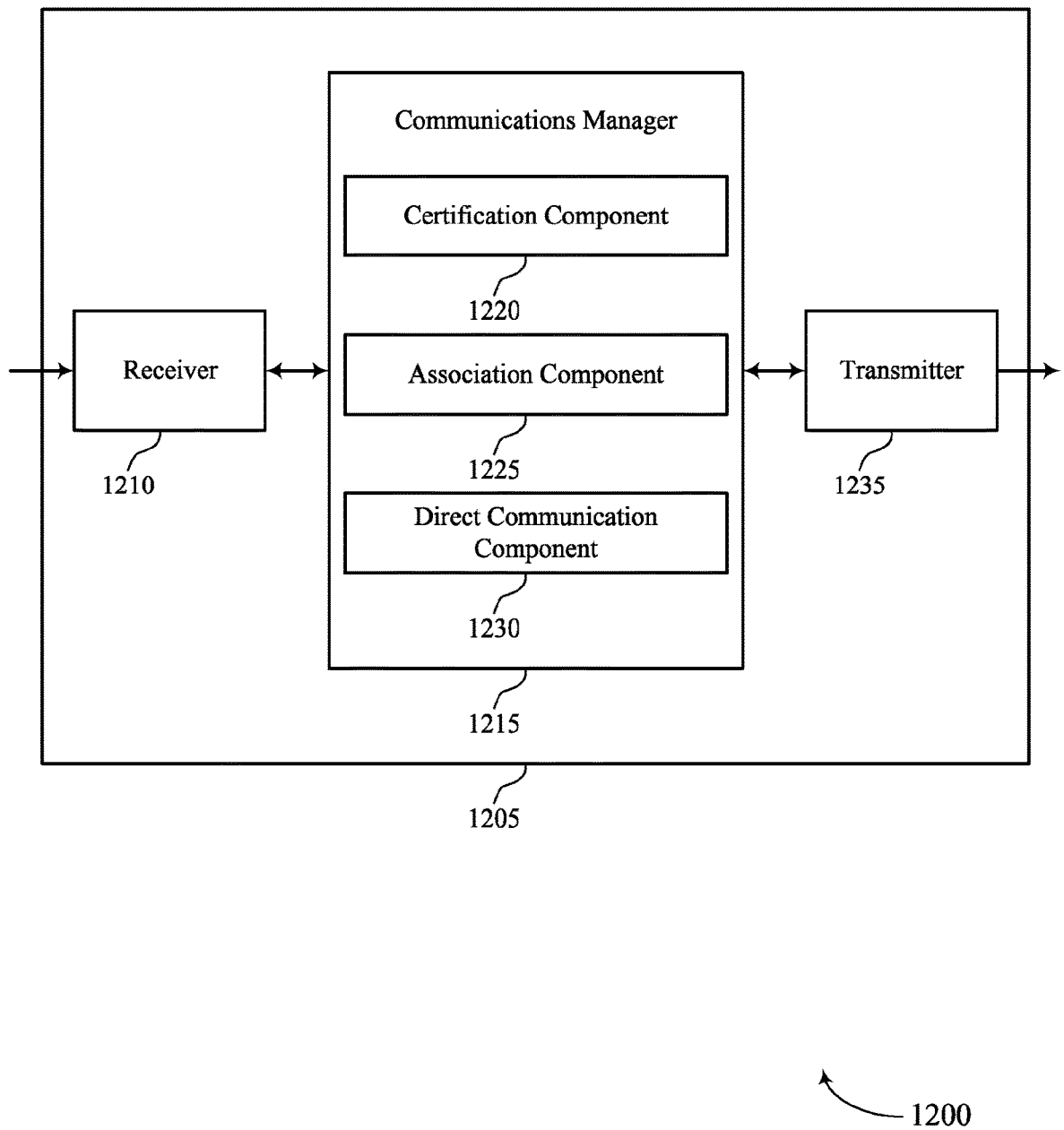

FIG. 12 shows a block diagram 1200 of a device 1205 that supports sensor performance indication in accordance with one or more aspects of the present disclosure. The device 1205 may be an example of aspects of a device 1105, or a UE 115 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to sensor performance indication, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a certification component 1220, an association component 1225, and a direct communication component 1230. The communications manager 1215 may be an example of aspects of the communications manager 1410 described herein.

In some cases, the device 1205 may be a device that transmits sensor information to another device as described herein. In such cases, the certification component 1220 may identify a configured set of one or more rules that apply to a sensor configured to monitor one or more conditions, the configured set of one or more rules defining an association between a set of performance values and a set of performance levels corresponding to one or more metrics of the sensor. In some cases, the configured set of one or more rules may be preconfigured at the device 1205. The association component 1225 may identify a performance value from the set of performance values for the sensor based on a performance level of the sensor and the configured set of one or more rules. The direct communication component 1230 may transmit, to a second wireless device, an indication of the configured set of one or more rules for the sensor in a message and an indication of the performance value for the sensor in the message.

In some cases, the device 1205 may be a device that receives sensor information from another device as described herein. In such cases, the certification component 1220 may receive, in a message, an indication of a configured set of one or more rules that applies to a sensor configured to monitor one or more conditions, the configured set of one or more rules defining an association between a set of performance values and a set of performance levels corresponding to one or more metrics of the sensor. The direct communication component 1230 may receive an indication of a performance value for the sensor in the message. The association component 1225 may identify a performance level of the sensor based on the performance value and the configured set of one or more rules.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
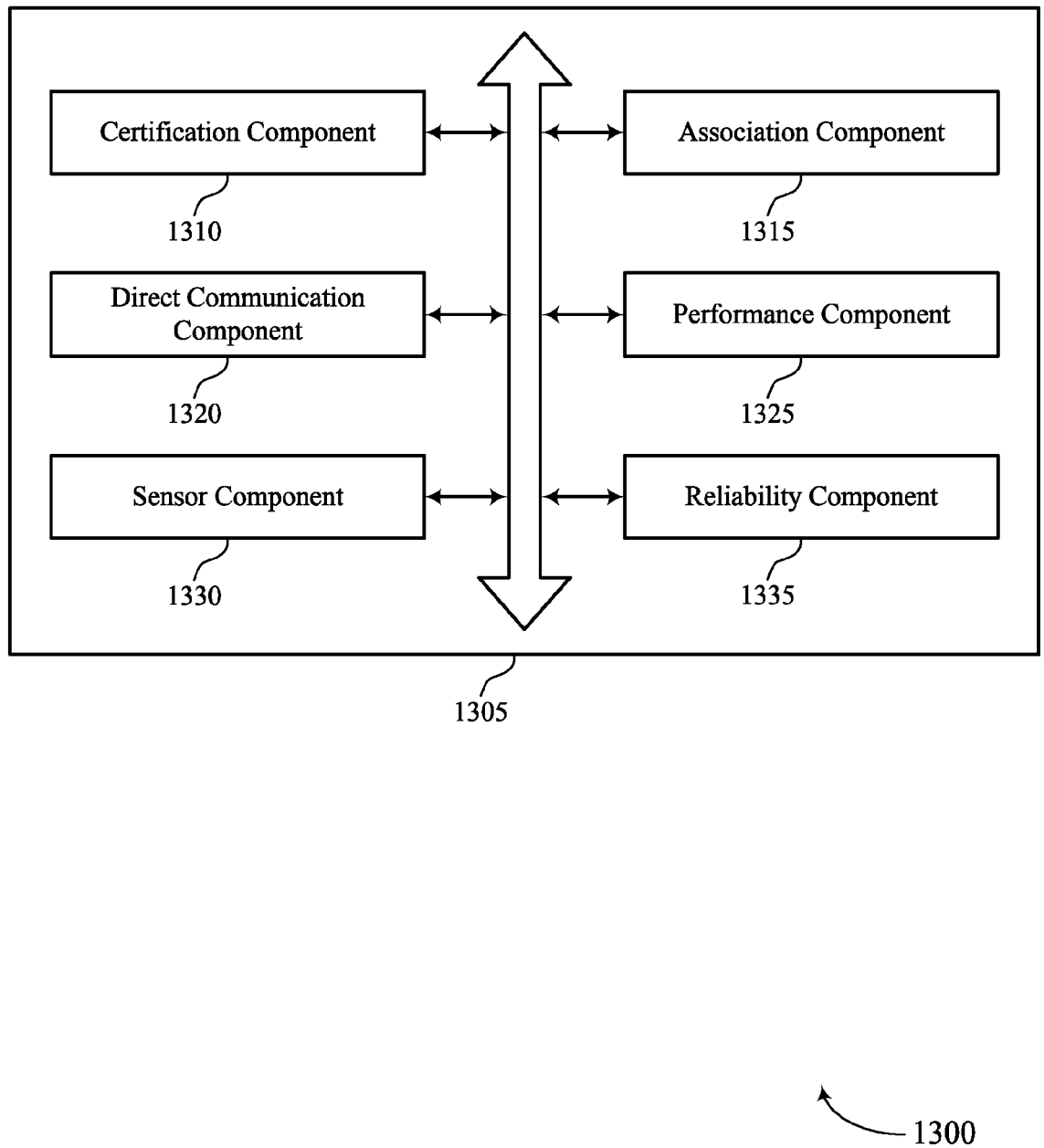
FIG. 13 shows a block diagram of a communications manager that supports sensor performance indication in accordance with one or more aspects of the present disclosure.

FIG. 13 shows a block diagram 1300 of a communications manager 1305 that supports sensor performance indication in accordance with one or more aspects of the present disclosure. The communications manager 1305 may be an example of aspects of a communications manager 1115, a communications manager 1215, or a communications manager 1410 described herein. The communications manager 1305 may include a certification component 1310, an association component 1315, a direct communication component 1320, a performance component 1325, and a sensor component 1330. Each of these modules may communicate, directly or indirectly, with one another (e.g., via one or more buses).

In some cases, the communications manager 1305 may be part of a device that transmits sensor information to another device as described herein. In such cases, the certification component 1310 may identify a configured set of one or more rules that apply to a sensor configured to monitor one or more conditions, the configured set of one or more rules defining an association between a set of performance values and a set of performance levels corresponding to one or more metrics of the sensor. In some cases, the one or more metrics of the sensor include a range of the sensor, a resolution of the sensor, a sensitivity of the sensor, an accuracy of the sensor, a refresh rate of the sensor, a depth perception of the sensor, and/or a field-of-view of the sensor. The association component 1315 may identify a performance value from the set of performance values for the sensor based on a performance level of the sensor and the configured set of one or more rules. The direct communication component 1320 may transmit, to a second wireless device, an indication of the configured set of one or more rules for the sensor in a message and an indication of the performance value for the sensor in the message.

In some examples, the indication of the configured set of one or more rules may be transmitted in a first data frame of the message. In some examples (e.g., when metric-specific rules are used), the direct communication component 1320 may transmit the performance value in a first data element of a second data frame of the message and the performance value may correspond to a first metric of the sensor. In some examples, the association component 1315 may identify a second performance value for the sensor based on a second performance level of the sensor and the configured set of one or more rules, the second performance value corresponding to a second metric different than the first metric. In some examples, the direct communication component 1320 may transmit the second performance value for the sensor in a second data element of the second data frame.

The performance component 1325 may determine the performance level of the sensor, the performance level corresponding to a first metric of the sensor. In some cases, the performance level includes an actual performance level of the sensor or an expected capability of the sensor. In some examples (e.g., when sensor-specific rules are used), the performance component 1325 may determine a second performance level of the sensor and the second performance level may correspond to a second metric different than the first metric. In such cases, the association component 1315 may identify the performance value identified based on the performance level and the second performance level.

In some examples, the performance component 1325 may determine the performance level of the sensor, the performance level corresponding to a first metric of the sensor. In some examples, the performance component 1325 may determine a second performance level of a second sensor and the second performance level may correspond to the first metric. In such cases (e.g., when fusion rules are used), the association component 1315 may identify the performance value based on a combination of the performance level and the second performance level. In some examples, the indication of the configured set of one or more rules is transmitted in a first data frame of the message and the indication of the performance value is transmitted in a second data frame of the message. In some examples, the performance component 1325 may determine a third performance level of the sensor, the third performance level corresponding to a second metric of the sensor. In some examples, the performance component 1325 may determine a fourth performance level of the second sensor, the fourth performance level corresponding to the second metric. In some examples (e.g., when fusion rules are used), the association component 1315 may identify a second performance value for the sensor based on a combination of the third performance level and the fourth performance level. In some examples, the direct communication component 1320 may transmit the second performance value for the sensor in a second data element of the second data frame.

In some examples, the performance component 1325 may determine the performance level of the sensor and the performance level may correspond to a first metric of the sensor. In some examples, the performance component 1325 may determine a second performance level of a second sensor and the second performance level may correspond to the first metric. In such examples (e.g., when fusion rules are used), the association component 1315 may identify the performance value based on a combination of the performance level and the second performance level. In some examples, the performance component 1325 may determine a third performance level of the sensor, the third performance level corresponding to a second metric of the sensor. In some examples, the performance component 1325 may determine a fourth performance level of the second sensor, the fourth performance level corresponding to the second metric. In such examples (e.g., when fusion-aggregation rules are used), the association component 1315 may identify the performance value based on a combination of the third and fourth performance levels.

In some examples, the certification component 1310 may transmit, in the message, a value that indicates a subset of rules of the configured set of one or more rules. In such cases, the association component 1315 may identify the performance value based on the subset of rules.

The sensor component 1330 may determine an identifier of the sensor. In some examples, the direct communication component 1320 may transmit an indication of the identifier in the message.

In some examples, the direct communication component 1320 may transmit information about an object detected by the sensor in the message, where the information is associated with the ID of the sensor.

In some examples, the sensor component 1330 may determine a type of the sensor. In some examples, the direct communication component 1320 may transmit an indication of the type in the message.

In some examples, the direct communication component 1320 may receive an indication of the performance level from a third wireless device, where the sensor is at the third wireless device and the performance level is identified based on the indication of the performance level.

In some cases, the communications manager 1305 may be part of a device that receives sensor information from another device as described herein. In such cases, certification component 1310 may receive, in a message, an indication of a configured set of one or more rules that applies to a sensor configured to monitor one or more conditions, the configured set of one or more rules defining an association between a set of performance values and a set of performance levels corresponding to one or more metrics of the sensor. The direct communication component 1320 may receive an indication of a performance value for the sensor in the message. The association component 1315 may identify a performance level of the sensor based on the performance value and the configured set of one or more rules.

In some examples, the reliability component 1335 may receive information about an object detected by the sensor and determine a reliability value of the information based on the performance level. In some cases, the information about the object is received in the same message as the indication of the configured set of one or more rules and the indication of the performance value. In some examples, the reliability component 1335 may receive an indication of an ID of the sensor in the message. In such cases, the information about the object may be associated with the ID of the sensor.

In some examples, the indication of the configured set of one or more rules is received in a first data frame of the message and the indication of the performance value is received in a first data element of a second data frame of the message. In some examples (e.g., when metric-specific rules are used), the direct communication component 1320 may receive a second performance value for the sensor in a second data element of the second data frame, the second performance value corresponding to a different metric of the sensor than the performance value. In some examples, the association component 1315 may identify a second performance level of the sensor based on the second performance value and the configured set of one or more rules.

In some examples (e.g., when sensor-specific rules are used), the association component 1315 may identify a second performance level of the sensor based on the performance value and the configured set of one or more rules. In such cases, the performance level may correspond to a first metric of the sensor and the second performance level may correspond to a second metric different than the first metric. In some examples, the first metric or the second metric is a range of the sensor, a resolution of the sensor, a sensitivity of the sensor, an accuracy of the sensor, a refresh rate of the sensor, a depth perception of the sensor, or a field-of-view of the sensor.

In some examples (e.g., when fusion rules are used), the configured set of one or more rules associates the performance value with an average performance level of a plurality of sensors and the average performance level corresponds to a metric of the sensor. In some examples (e.g., when fusion-aggregation rules are used), the configured set of one or more rules associates the performance value with a second average performance level of the plurality of sensors and the second average performance level corresponds to a second metric of the sensor.

In some examples, the sensor component 1330 may receive an indication of a type of the sensor in the message and determine the type of the sensor based on the indication of the type.

In some examples, the certification component 1310 may receive, in the message, a value that indicates a subset of rules of the configured set of one or more rules. In such cases, the association component 1315 may identify the performance value based on the subset of rules.

Figure 14:
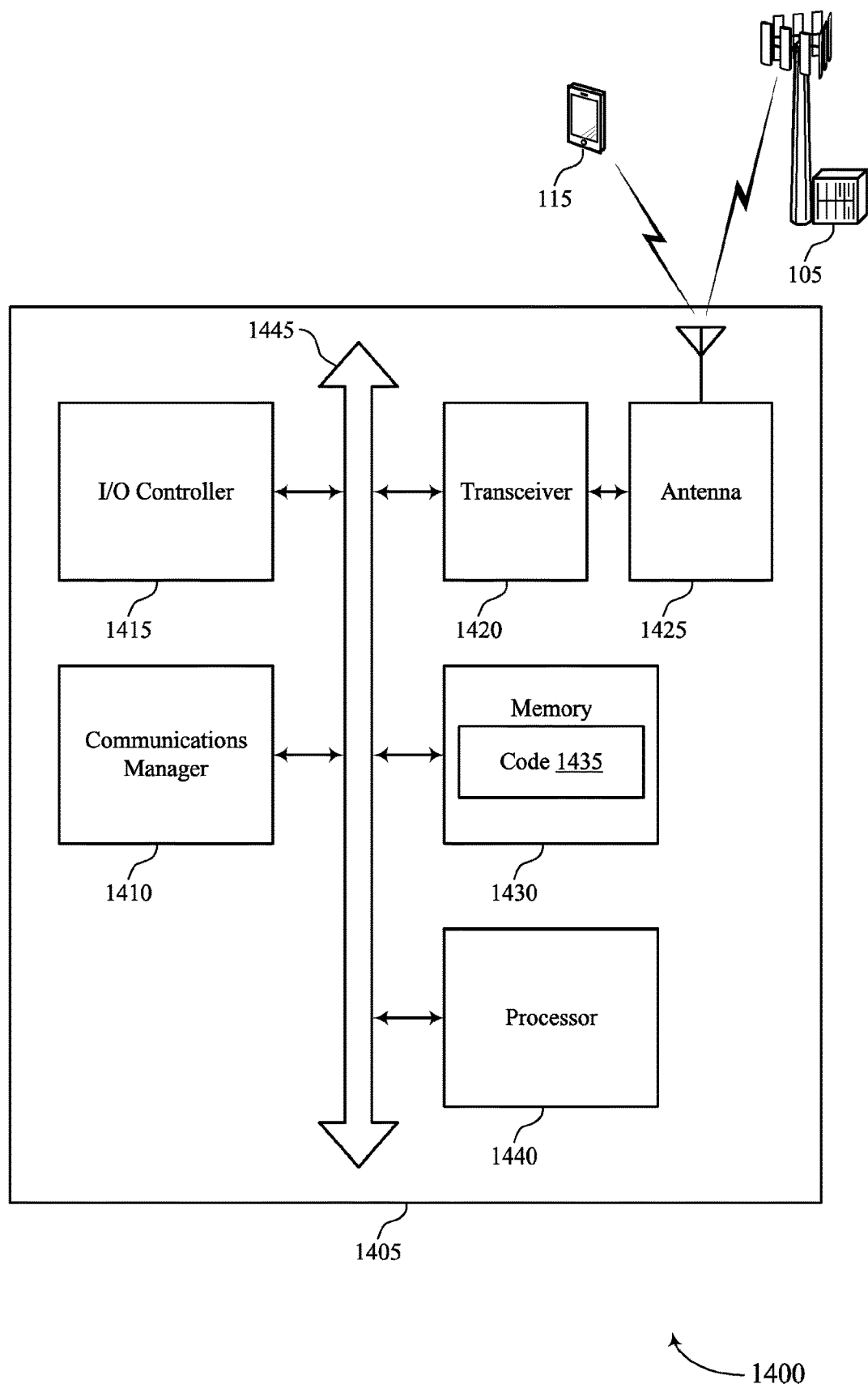
FIG. 14 shows a diagram of a system including a device that supports sensor performance indication in accordance with one or more aspects of the present disclosure.

FIG. 14 shows a diagram of a system 1400 including a device 1405 that supports sensor performance indication in accordance with one or more aspects of the present disclosure. The device 1405 may be an example of or include the components of device 1105, device 1205, or a UE 115 as described herein. The device 1405 may include components for bi-directional voice and data communications including components for transmitting and receiving communications, including a communications manager 1410, an I/O controller 1415, a transceiver 1420, an antenna 1425, memory 1430, and a processor 1440. These components may be in electronic communication via one or more buses (e.g., bus 1445).

In some examples, the device 1405 may transmit sensor information to another device as described herein. In such examples, the communications manager 1410 may identify a configured set of one or more rules that apply to a sensor configured to monitor one or more conditions, the configured set of one or more rules defining an association between a set of performance values and a set of performance levels corresponding to one or more metrics of the sensor; identify a performance value from the set of performance values for the sensor based on a performance level of the sensor and the configured set of one or more rules; and transmit, to a second wireless device, an indication of the configured set of one or more rules for the sensor in a message and an indication of the performance value for the sensor in the message.

In some examples, the device 1405 may receive sensor information from another device as described herein. In such examples, the communications manager 1410 may receive, in a message, an indication of a configured set of one or more rules that applies to a sensor configured to monitor one or more conditions, the configured set of one or more rules defining an association between a set of performance values and a set of performance levels corresponding to one or more metrics of the sensor; receive an indication of a performance value for the sensor in the message; and identify a performance level of the sensor based on the performance value and the configured set of one or more rules.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include random-access memory (RAM) and read-only memory (ROM). The memory 1430 may store computer-readable, computer-executable code 1435 including instructions that, when executed, cause the processor to perform various functions described herein. In some cases, the memory 1430 may contain, among other things, a basic input/output system (BIOS) which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting sensor performance indication).

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
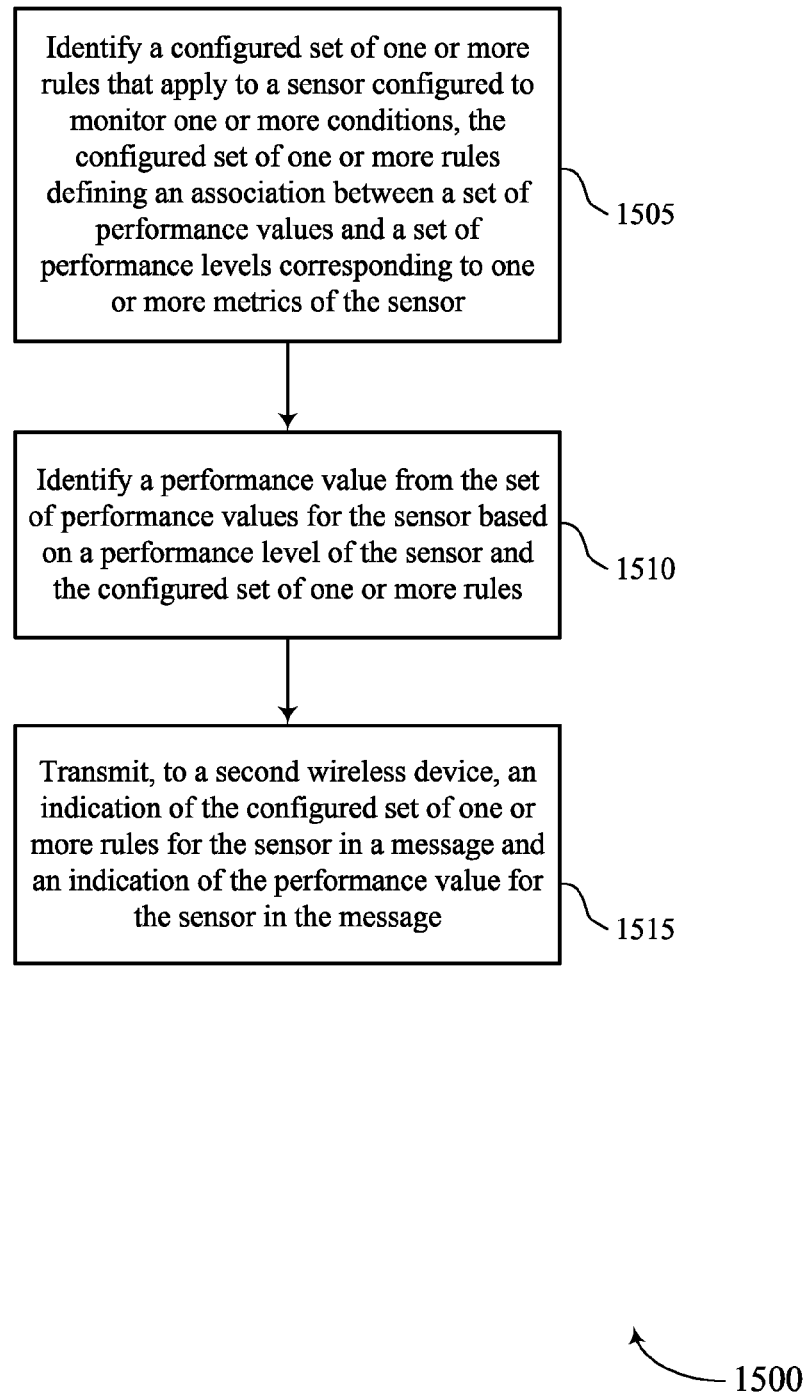
FIGS. 15 and 16 show flowcharts illustrating methods that support sensor performance indication in accordance with one or more aspects of the present disclosure.

FIG. 15 shows a flowchart illustrating a method 1500 that supports sensor performance indication in accordance with one or more aspects of the present disclosure. The operations of method 1500 may be implemented by a UE 115 or its components as described herein. For example, the operations of method 1500 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 1505, the UE may identify a configured set of one or more rules that apply to a sensor configured to monitor one or more conditions, the configured set of one or more rules defining an association between a set of performance values and a set of performance levels corresponding to one or more metrics of the sensor. The operations of 1505 may be performed according to the methods described herein. In some examples, aspects of the operations of 1505 may be performed by a certification component as described with reference to FIGS. 11 through 14.

At 1510, the UE may identify a performance value from the set of performance values for the sensor based on a performance level of the sensor and the configured set of one or more rules. The operations of 1510 may be performed according to the methods described herein. In some examples, aspects of the operations of 1510 may be performed by an association component as described with reference to FIGS. 11 through 14.

At 1515, the UE may transmit, to a second wireless device, an indication of the configured set of one or more rules for the sensor in a message and an indication of the performance value for the sensor in the message. The operations of 1515 may be performed according to the methods described herein. In some examples, aspects of the operations of 1515 may be performed by a direct communication component as described with reference to FIGS. 12 and 13.

Figure 16:
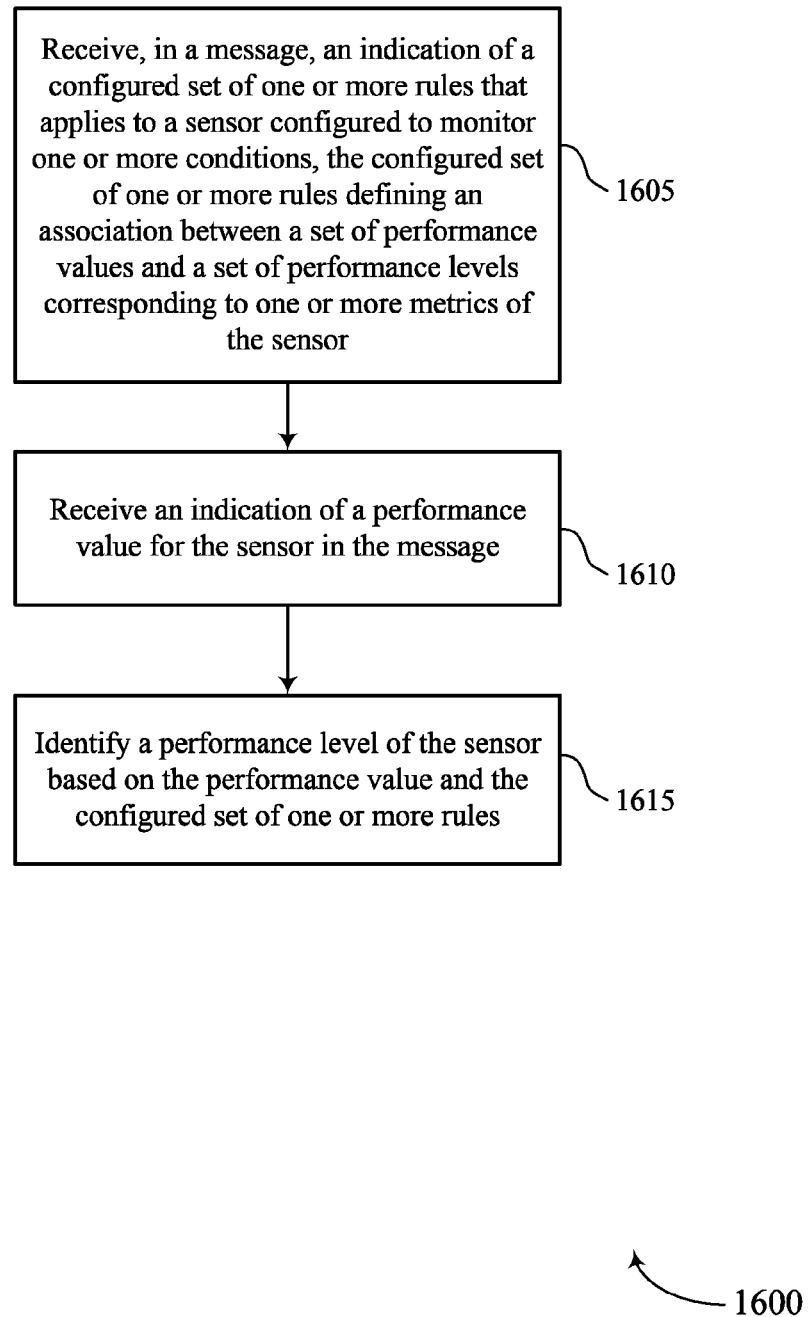

FIG. 16 shows a flowchart illustrating a method 1600 that supports sensor performance indication in accordance with one or more aspects of the present disclosure. The operations of method 1600 may be implemented by a UE 115 or its components as described herein. For example, the operations of method 1600 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 1605, the UE may receive, in a message, an indication of a configured set of one or more rules that applies to a sensor configured to monitor one or more conditions, the configured set of one or more rules defining an association between a set of performance values and a set of performance levels corresponding to one or more metrics of the sensor. The operations of 1605 may be performed according to the methods described herein. In some examples, aspects of the operations of 1605 may be performed by a certification component as described with reference to FIGS. 12 and 13.

At 1610, the UE may receive an indication of a performance value for the sensor in the message. The operations of 1610 may be performed according to the methods described herein. In some examples, aspects of the operations of 1610 may be performed by a direct communication component as described with reference to FIGS. 12 and 13.

At 1615, the UE may identify a performance level of the sensor based on the performance value and the configured set of one or more rules. The operations of 1615 may be performed according to the methods described herein. In some examples, aspects of the operations of 1615 may be performed by an association component as described with reference to FIGS. 12 and 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a wireless device, comprising:
    one or more memories; and
    one or more processors coupled with the one or more memories and configured to cause the wireless device to:
        identify a configured set of one or more rules that applies to a sensor configured to monitor one or more conditions, wherein the configured set of one or more rules defines an association between a set of performance values and a set of performance levels associated with one or more metrics of the sensor;
        identify a performance value from the set of performance values for the sensor based at least in part on a performance level of the sensor and the configured set of one or more rules; and
        transmit, to a second wireless device, an indication of the configured set of one or more rules for the sensor in a message and an indication of the performance value for the sensor in the message.

2. The apparatus of claim 1, wherein the indication of the configured set of one or more rules is transmitted in a first data frame of the message, and wherein the one or more processors are further configured to cause the wireless device to:
    transmit the performance value in a first data element of a second data frame of the message, the performance value associated with a first metric of the sensor;
    identify a second performance value for the sensor based at least in part on a second performance level of the sensor and the configured set of one or more rules, the second performance value associated with a second metric different than the first metric; and transmit the second performance value for the sensor in a second data element of the second data frame.

3. The apparatus of claim 1, wherein the one or more processors are further configured to cause the wireless device to:

determine the performance level of the sensor, the performance level associated with a first metric of the sensor; and determine a second performance level of the sensor, the second performance level associated with a second metric different than the first metric, wherein the performance value is identified based at least in part on the performance level and the second performance level.

4. The apparatus of claim 1, wherein the one or more processors are further configured to cause the wireless device to:

determine the performance level of the sensor, the performance level associated with a first metric of the sensor; and determine a second performance level of a second sensor, wherein the second performance level corresponds to the first metric and the performance value is identified based at least in part on a combination of the performance level and the second performance level.

5. The apparatus of claim 4, wherein the indication of the configured set of one or more rules is transmitted in a first data frame of the message and the indication of the performance value is transmitted in a second data frame of the message, and wherein the one or more processors are further configured to cause the wireless device to:

determine a third performance level of the sensor, the third performance level associated with a second metric of the sensor;

determine a fourth performance level of the second sensor, the fourth performance level associated with the second metric;

identify a second performance value for the sensor based at least in part on a combination of the third performance level and the fourth performance level; and transmit the second performance value for the sensor in a second data element of the second data frame.

6. The apparatus of claim 4, wherein the one or more processors are further configured to cause the wireless device to:

determine a third performance level of the sensor, the third performance level associated with a second metric of the sensor; and determine a fourth performance level of the second sensor, the fourth performance level associated with the second metric, wherein the performance value is identified based at least in part on a combination of the third performance level and the fourth performance level.

7. The apparatus of claim 1, wherein the one or more processors are further configured to cause the wireless device to:

determine an identifier of the sensor; and transmit an indication of the identifier in the message.

8. The apparatus of claim 7, further comprising:

one or more antennas operable to transmit information for an object detected by the sensor in the message, wherein the information is associated with the identifier of the sensor.

9. The apparatus of claim 1, wherein the one or more processors are further configured to cause the wireless device to:

determine a type of the sensor; and transmit an indication of the type in the message.

10. The apparatus of claim 1, wherein the one or more processors are further configured to cause the wireless device to:

transmit, in the message, a value that indicates a subset of rules of the configured set of one or more rules, wherein the performance value is identified based at least in part on the sub set of rules.

11. The apparatus of claim 1, wherein the one or more processors are further configured to cause the wireless device to:

receive an indication of the performance level from a third wireless device, wherein the sensor is at the third wireless device and the performance level is identified based at least in part on the indication of the performance level.

12. The apparatus of claim 1, wherein the one or more metrics of the sensor comprise a range of the sensor, a resolution of the sensor, a sensitivity of the sensor, an accuracy of the sensor, a refresh rate of the sensor, a depth perception of the sensor, a field-of-view of the sensor, or a combination thereof.

13. The apparatus of claim 1, wherein the performance level comprises an actual performance level of the sensor or an expected capability of the sensor.

14. An apparatus for wireless communication at a wireless device, comprising:

one or more memories; and one or more processors coupled with the one or more memories and configured to cause the wireless device to:

receive, in a message, an indication of a configured set of one or more rules that applies to a sensor configured to monitor one or more conditions, wherein the configured set of one or more rules defines an association between a set of performance values and a set of performance levels associated with one or more metrics of the sensor;

receive an indication of a performance value for the sensor in the message; and identify a performance level of the sensor based at least in part on the performance value and the configured set of one or more rules.

15. The apparatus of claim 14, wherein the one or more processors are further configured to cause the wireless device to:

receive information associated with an object detected by the sensor; and determine a reliability value of the information based at least in part on the performance level.

16. The apparatus of claim 15, wherein the information associated with the object is received in a same message as the indication of the configured set of one or more rules and the indication of the performance value.

17. The apparatus of claim 15, wherein the one or more processors are further configured to cause the wireless device to:

receive an indication of an identifier (ID) of the sensor in the message, wherein the information associated with the object is associated with the ID of the sensor.

18. The apparatus of claim 14, wherein the indication of the configured set of one or more rules is received in a first data frame of the message and the indication of the performance value is received in a first data element of a second data frame of the message, and wherein the one or more processors are further configured to cause the wireless device to:
receive a second performance value for the sensor in a second data element of the second data frame, the second performance value associated with a different metric of the sensor than the performance value; and
identify a second performance level of the sensor based at least in part on the second performance value and the configured set of one or more rules.

19. The apparatus of claim 14, wherein the one or more processors are further configured to cause the wireless device to:
identify a second performance level of the sensor based at least in part on the performance value and the configured set of one or more rules, wherein the performance level corresponds to a first metric of the sensor and the second performance level corresponds to a second metric different than the first metric.

20. The apparatus of claim 19, wherein the first metric or the second metric comprises a range of the sensor, a resolution of the sensor, a sensitivity of the sensor, an accuracy of the sensor, a refresh rate of the sensor, a depth perception of the sensor, or a field-of-view of the sensor.

21. The apparatus of claim 14, wherein the configured set of one or more rules associates the performance value with an average performance level of a plurality of sensors and the average performance level corresponds to a metric of the sensor, and wherein the configured set of one or more rules associates the performance value with a second average performance level of the plurality of sensors and the second average performance level corresponds to a second metric of the sensor.

22. The apparatus of claim 14, wherein the one or more processors are further configured to cause the wireless device to:
receive an indication of a type of the sensor in the message; and
determine the type of the sensor based on the indication of the type.

23. The apparatus of claim 14, further comprising:
one or more antennas operable to receive, in the message, a value that indicates a subset of rules of the configured set of one or more rules, wherein the performance value is identified based at least in part on the subset of rules.

24. A method of wireless communication at a wireless device, comprising:
identifying a configured set of one or more rules that applies to a sensor configured to monitor one or more conditions, the configured set of one or more rules defining an association between a set of performance values and a set of performance levels corresponding to one or more metrics of the sensor;
identifying a performance value from the set of performance values for the sensor based at least in part on a performance level of the sensor and the configured set of one or more rules; and
transmitting, to a second wireless device, an indication of the configured set of one or more rules for the sensor in a message and an indication of the performance value for the sensor in the message.

25. The method of claim 24, wherein the indication of the configured set of one or more rules is transmitted in a first data frame of the message, the method further comprising:
transmitting the performance value in a first data element of a second data frame of the message, the performance value corresponding to a first metric of the sensor;
identifying a second performance value for the sensor based at least in part on a second performance level of the sensor and the configured set of one or more rules, the second performance value corresponding to a second metric different than the first metric; and
transmitting the second performance value for the sensor in a second data element of the second data frame.

26. A method of wireless communication at a wireless device, comprising:
receiving, in a message, an indication of a configured set of one or more rules that applies to a sensor configured to monitor one or more conditions, the configured set of one or more rules defining an association between a set of performance values and a set of performance levels corresponding to one or more metrics of the sensor;
receiving an indication of a performance value for the sensor in the message; and
identifying a performance level of the sensor based at least in part on the performance value and the configured set of one or more rules.

27. The method of claim 26, further comprising:
receiving information about an object detected by the sensor; and
determining a reliability value of the information based at least in part on the performance level.

28. An apparatus for wireless communication at a wireless device, comprising:
means for identifying a configured set of one or more rules that applies to a sensor configured to monitor one or more conditions, the configured set of one or more rules defining an association between a set of performance values and a set of performance levels corresponding to one or more metrics of the sensor;
means for identifying a performance value from the set of performance values for the sensor based at least in part on a performance level of the sensor and the configured set of one or more rules; and
means for transmitting, to a second wireless device, an indication of the configured set of one or more rules for the sensor in a message and an indication of the performance value for the sensor in the message.

29. The apparatus of claim 28, wherein the indication of the configured set of one or more rules is transmitted in a first data frame of the message, the apparatus further comprising:
means for transmitting the performance value in a first data element of a second data frame of the message, the performance value corresponding to a first metric of the sensor;
means for identifying a second performance value for the sensor based at least in part on a second performance level of the sensor and the configured set of one or more rules, the second performance value corresponding to a second metric different than the first metric; and
means for transmitting the second performance value for the sensor in a second data element of the second data frame.

30. An apparatus for wireless communication at a wireless device, comprising:
means for receiving, in a message, an indication of a configured set of one or more rules that applies to a sensor configured to monitor one or more conditions, the configured set of one or more rules defining an association between a set of performance values and a set of performance levels corresponding to one or more metrics of the sensor;

means for receiving an indication of a performance value for the sensor in the message; and means for identifying a performance level of the sensor based at least in part on the performance value and the configured set of one or more rules.

31. The apparatus of claim 30, further comprising:

means for receiving information about an object detected by the sensor; and means for determining a reliability value of the information based at least in part on the performance level.

32. A non-transitory computer-readable medium storing code for wireless communications at a wireless device, the code comprising instructions executable by a processor one or more processors to cause the wireless device to:

identify a configured set of one or more rules that applies to a sensor configured to monitor one or more conditions, the configured set of one or more rules defining an association between a set of performance values and a set of performance levels corresponding to one or more metrics of the sensor;

identify a performance value from the set of performance values for the sensor based at least in part on a performance level of the sensor and the configured set of one or more rules; and transmit, to a second wireless device, an indication of the configured set of one or more rules for the sensor in a message and an indication of the performance value for the sensor in the message.

33. The non-transitory computer-readable medium of claim 32, wherein the indication of the configured set of one or more rules is transmitted in a first data frame of the message, and wherein the code further comprises instructions executable by the one or more processors to cause the wireless device to:

transmit the performance value in a first data element of a second data frame of the message, the performance value corresponding to a first metric of the sensor;

identify a second performance value for the sensor based at least in part on a second performance level of the sensor and the configured set of one or more rules, the second performance value corresponding to a second metric different than the first metric; and transmit the second performance value for the sensor in a second data element of the second data frame.

34. A non-transitory computer-readable medium storing code for wireless communications at a wireless device, the code comprising instructions executable by one or more processors to cause the wireless device to:

receive, in a message, an indication of a configured set of one or more rules that applies to a sensor configured to monitor one or more conditions, the configured set of one or more rules defining an association between a set of performance values and a set of performance levels corresponding to one or more metrics of the sensor;

receive an indication of a performance value for the sensor in the message; and identify a performance level of the sensor based at least in part on the performance value and the configured set of one or more rules.

35. The non-transitory computer-readable medium of claim 34, wherein the code further comprises instructions executable by the one or more processors to cause the wireless device to:

receive information about an object detected by the sensor; and determine a reliability value of the information based at least in part on the performance level.

36. An apparatus for wireless communication at a wireless device, comprising:

one or more memories; and one or more processors coupled with the one or more memories and configured to cause the wireless device to:

identify a configured set of one or more rules that applies to a sensor configured to monitor one or more conditions of an environment of the wireless device, wherein the configured set of one or more rules defines an association between a set of performance values and a set of performance levels corresponding to one or more metrics of the sensor;

identify a performance value from the set of performance values for the sensor based at least in part on a performance level of the sensor and the configured set of one or more rules, wherein the performance level of the sensor depends on the one or more conditions of the environment monitored by the sensor; and transmit, to a second wireless device, an indication of the configured set of one or more rules for the sensor in a message and an indication of the performance value for the sensor in the message.

37. The apparatus of claim 36, wherein the indication of the configured set of one or more rules and the indication of the performance value enable the second wireless device to convert the performance value into an actual performance level of the sensor.

38. The apparatus of claim 36, wherein the indication of the configured set of one or more rules is transmitted in a first data frame of the message, and wherein the one or more processors are further configured to cause the wireless device to:

transmit the performance value in a first data element of a second data frame of the message, the performance value corresponding to a first metric of the sensor;

identify a second performance value for the sensor based at least in part on a second performance level of the sensor and the configured set of one or more rules, the second performance value corresponding to a second metric different than the first metric; and transmit the second performance value for the sensor in a second data element of the second data frame.

39. The apparatus of claim 36, wherein the one or more processors are further configured to cause the wireless device to:

determine the performance level of the sensor, the performance level corresponding to a first metric of the sensor; and determine a second performance level of the sensor, the second performance level corresponding to a second metric different than the first metric, wherein the performance value is identified based at least in part on the performance level and the second performance level.

40. The apparatus of claim 36, wherein the one or more processors are further configured to cause the wireless device to:

determine the performance level of the sensor, the performance level corresponding to a first metric of the sensor; and determine a second performance level of a second sensor, wherein the second performance level corresponds to the first metric and the performance value is identified based at least in part on a combination of the performance level and the second performance level.

41. The apparatus of claim 40, wherein the indication of the configured set of one or more rules is transmitted in a first data frame of the message and the indication of the performance value is transmitted in a second data frame of the message, and wherein the one or more processors are further configured to cause the wireless device to:
   determine a third performance level of the sensor, the third performance level corresponding to a second metric of the sensor;
   determine a fourth performance level of the second sensor, the fourth performance level corresponding to the second metric;
   identify a second performance value for the sensor based at least in part on a combination of the third performance level and the fourth performance level; and
   transmit the second performance value for the sensor in a second data element of the second data frame.

42. The apparatus of claim 40, wherein the one or more processors are further configured to cause the wireless device to:
   determine a third performance level of the sensor, the third performance level corresponding to a second metric of the sensor; and
   determine a fourth performance level of the second sensor, the fourth performance level corresponding to the second metric, wherein the performance value is identified based at least in part on a combination of the third performance level and the fourth performance level.

43. The apparatus of claim 36, wherein the one or more processors are further configured to cause the wireless device to:
   determine an identifier of the sensor;
   transmit an indication of the identifier in the message; and
   transmit information about an object detected by the sensor in the message, wherein the information is associated with the identifier of the sensor.

44. The apparatus of claim 43, further comprising:
   one or more antennas operable to transmit the information about the object detected by the sensor in the message, wherein the information is associated with the identifier of the sensor.

45. The apparatus of claim 36, wherein the one or more processors are further configured to cause the wireless device to:
   determine a type of the sensor; and
   transmit an indication of the type in the message.

46. The apparatus of claim 36, wherein the one or more processors are further configured to cause the wireless device to:
   transmit, in the message, a value that indicates a subset of rules of the configured set of one or more rules, wherein the performance value is identified based at least in part on the subset of rules.

47. The apparatus of claim 36, wherein the one or more processors are further configured to cause the wireless device to:
   receive an indication of the performance level from a third wireless device, wherein the sensor is at the third wireless device and the performance level is identified based at least in part on the indication of the performance level.

48. The apparatus of claim 36, wherein the one or more metrics of the sensor comprise a range of the sensor, a resolution of the sensor, a sensitivity of the sensor, an accuracy of the sensor, a refresh rate of the sensor, a depth perception of the sensor, a field-of-view of the sensor, or a combination thereof.

49. The apparatus of claim 36, wherein the performance level comprises an actual performance level of the sensor or an expected capability of the sensor.

50. An apparatus for wireless communication at a wireless device, comprising:
   one or more memories; and
   one or more processors coupled with the one or more memories and configured to cause the wireless device to:
      receive, in a message, an indication of a configured set of one or more rules that applies to a sensor configured to monitor one or more conditions, wherein the configured set of one or more rules defines an association between a set of performance values and a set of performance levels corresponding to one or more metrics of the sensor;
      receive in the message a certification that indicates a performance value for the sensor, wherein the performance value certifies a performance of the sensor; and
      identify a performance level of the sensor based at least in part on the performance value and the configured set of one or more rules.

51. The apparatus of claim 50, wherein the one or more processors are further configured to cause the wireless device to:
   receive information associated with an object detected by the sensor; and
   determine a reliability value of the information based at least in part on the performance level.

52. The apparatus of claim 51, wherein the information associated with the object is received in a same message as the indication of the configured set of one or more rules and the indication of the performance value.

53. The apparatus of claim 51, wherein the one or more processors are further configured to cause the wireless device to:
   receive an indication of an identifier (ID) of the sensor in the message, wherein the information associated with the object is associated with the ID of the sensor.

54. The apparatus of claim 50, wherein the indication of the configured set of one or more rules is received in a first data frame of the message and the indication of the performance value is received in a first data element of a second data frame of the message, and wherein the one or more processors are further configured to cause the wireless device to:
   receive a second performance value for the sensor in a second data element of the second data frame, the second performance value corresponding to a different metric of the sensor than the performance value; and
   identify a second performance level of the sensor based at least in part on the second performance value and the configured set of one or more rules.

55. A method of wireless communication at a wireless device, comprising:
   identifying a configured set of one or more rules that applies to a sensor configured to monitor one or more conditions of an environment of the wireless device, wherein the configured set of one or more rules defines an association between a set of performance values and a set of performance levels corresponding to one or more metrics of the sensor;
   identifying a performance value from the set of performance values for the sensor based at least in part on a performance level of the sensor and the configured set of one or more rules, wherein the performance level of the sensor depends on the one or more conditions of the environment monitored by the sensor; and transmitting, to a second wireless device, an indication of the configured set of one or more rules for the sensor in a message and an indication of the performance value for the sensor in the message.

56. The method of claim 55, wherein the indication of the configured set of one or more rules and the indication of the performance value enable the second wireless device to convert the performance value into an actual performance level of the sensor.

57. The method of claim 55, wherein the indication of the configured set of one or more rules is transmitted in a first data frame of the message, the method further comprising:

transmitting the performance value in a first data element of a second data frame of the message, the performance value corresponding to a first metric of the sensor;

identifying a second performance value for the sensor based at least in part on a second performance level of the sensor and the configured set of one or more rules, the second performance value corresponding to a second metric different than the first metric; and transmitting the second performance value for the sensor in a second data element of the second data frame.

58. A method of wireless communication at a wireless device, comprising:

receiving, in a message, an indication of a configured set of one or more rules that applies to a sensor configured to monitor one or more conditions, wherein the configured set of one or more rules defines an association between a set of performance values and a set of performance levels corresponding to one or more metrics of the sensor;

receiving in the message a certification that indicates a performance value for the sensor, whereby the performance value certifies a performance of the sensor; and identifying a performance level of the sensor based at least in part on the performance value and the configured set of one or more rules.

59. The method of claim 58, further comprising:

receiving information associated with an object detected by the sensor; and determining a reliability value of the information based at least in part on the performance level.

60. The method of claim 58, wherein the indication of the configured set of one or more rules is received in a first data frame of the message and the indication of the performance value is received in a first data element of a second data frame of the message, the method further comprising:

receiving a second performance value for the sensor in a second data element of the second data frame, the second performance value corresponding to a different metric of the sensor than the performance value; and identifying a second performance level of the sensor based at least in part on the second performance value and the configured set of one or more rules.

* * * * *